(12) United States Patent
Takahashi et al.

(10) Patent No.: US 9,625,687 B2
(45) Date of Patent: *Apr. 18, 2017

(54) IMAGE PICKUP APPARATUS AND ZOOM LENS USED IN IMAGE PICKUP APPARATUS

(71) Applicant: OLYMPUS CORPORATION, Tokyo (JP)

(72) Inventors: Toshio Takahashi, Tokyo (JP); Hiroshi Kodama, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,699

(22) Filed: Aug. 31, 2015

(65) Prior Publication Data

US 2015/0370049 A1    Dec. 24, 2015

Related U.S. Application Data

(62) Division of application No. 13/935,908, filed on Jul. 5, 2013, now Pat. No. 9,158,098.

(30) Foreign Application Priority Data

Jul. 20, 2012  (JP) ................................ 2012-161533

(51) Int. Cl.
*G02B 15/14* (2006.01)
*G02B 15/173* (2006.01)
(Continued)

(52) U.S. Cl.
CPC ........... *G02B 15/14* (2013.01); *G02B 15/173* (2013.01); *H04N 5/2254* (2013.01);
(Continued)

(58) Field of Classification Search
None
See application file for complete search history.

(56) References Cited

U.S. PATENT DOCUMENTS 8,130,451 B2  3/2012  Saito
8,228,620 B2  7/2012  Ohtake et al.
(Continued)

FOREIGN PATENT DOCUMENTS

JP   2009-251280   10/2009
JP   2011-004832   1/2011
(Continued)

*Primary Examiner* — Darryl J Collins
*Assistant Examiner* — Gary O'Neill
(74) *Attorney, Agent, or Firm* — Andrews Kurth Kenyon LLP

(57) ABSTRACT

The 1st positive lens unit is located closer to the object side at the telephoto end than at the wide angle end. The distance between the 1st negative lens unit and the 1st positive lens unit is larger at the telephoto end than at the wide angle end. The distance between the image side lens unit group and the 1st negative lens unit varies during zooming from the wide angle end to the telephoto end. The image side lens unit group comprises a 2nd positive lens unit and a 3rd positive lens unit. The distance between the 2nd positive lens unit and the 1st negative lens unit is smaller at the telephoto end than at the wide angle end. The distance between the 3rd positive lens unit and the 2nd positive lens unit varies during zooming from the wide angle end to the telephoto end.

36 Claims, 20 Drawing Sheets

(51) Int. Cl.
*H04N 5/225* (2006.01)
*H04N 5/232* (2006.01)
*G02B 15/20* (2006.01)
*G02B 15/22* (2006.01)

(52) U.S. Cl.
CPC ..... *H04N 5/23209* (2013.01); *H04N 5/23296* (2013.01); *G02B 15/20* (2013.01); *G02B 15/22* (2013.01)

(56) References Cited

U.S. PATENT DOCUMENTS

| | | | |
|---|---|---|---|
| 2007/0097517 A1* | 5/2007 | Ohashi | G02B 1/11 359/692 |
| 2009/0040623 A1* | 2/2009 | Morooka | G02B 27/0025 359/687 |
| 2011/0080653 A1 | 4/2011 | Kimura | |
| 2012/0019924 A1 | 1/2012 | Shimomura | |
| 2013/0050843 A1* | 2/2013 | Nakamura | G02B 15/173 359/684 |
| 2015/0234164 A1* | 8/2015 | Kawamura | G02B 15/163 348/345 |

FOREIGN PATENT DOCUMENTS

| | | |
|---|---|---|
| JP | 2011-090265 | 5/2011 |
| JP | 2012-027308 | 2/2012 |

* cited by examiner

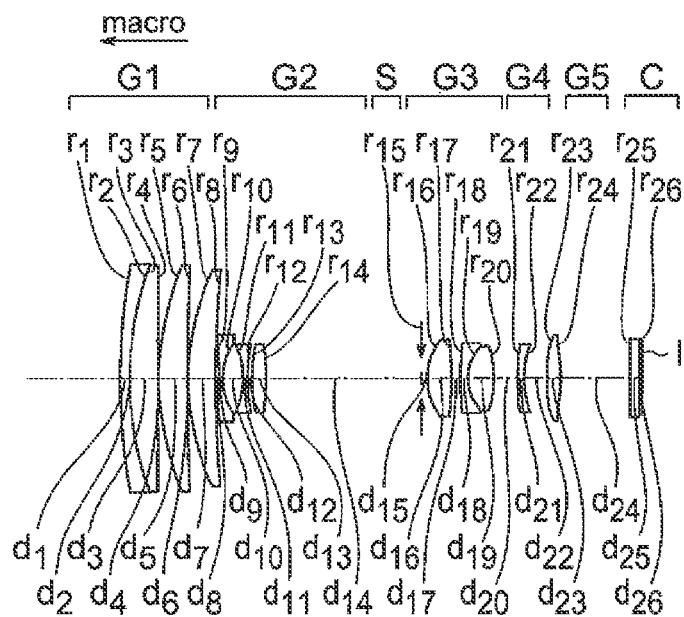
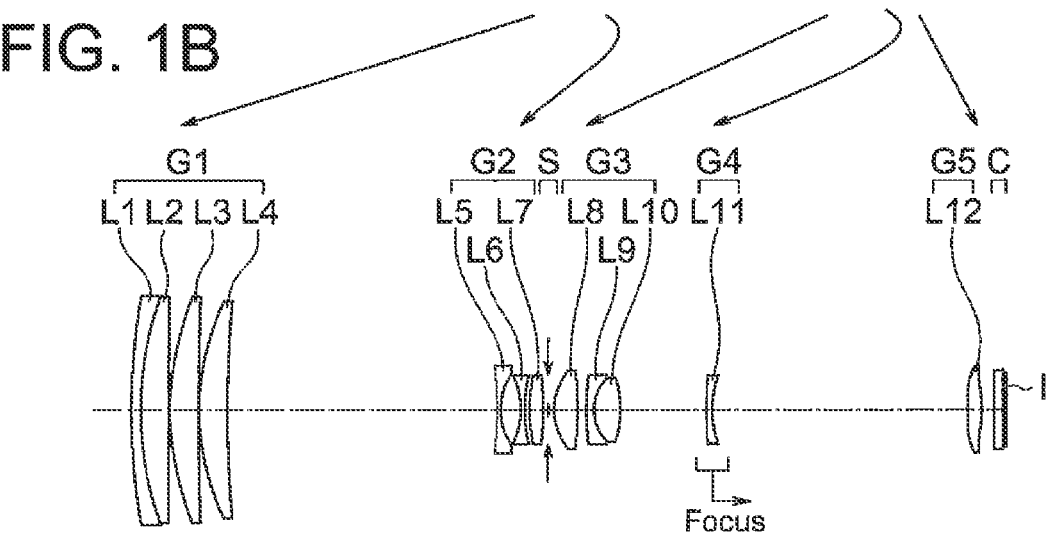

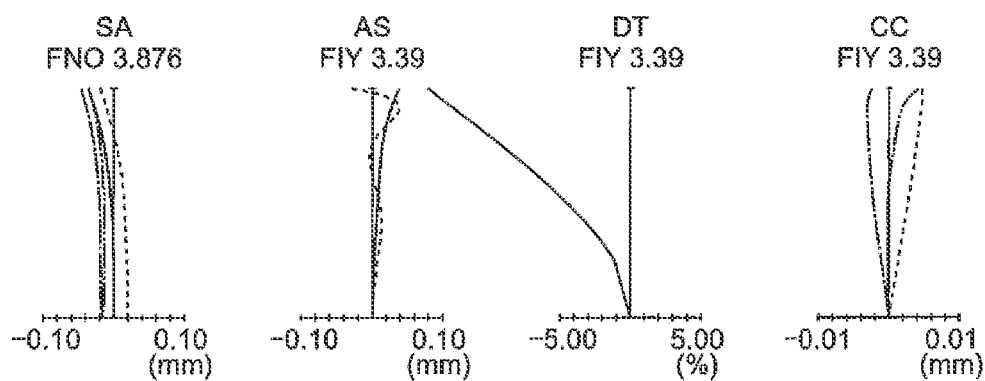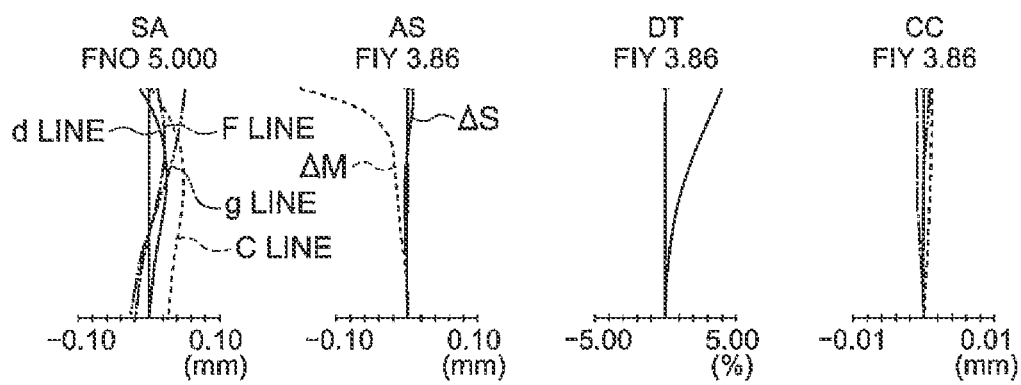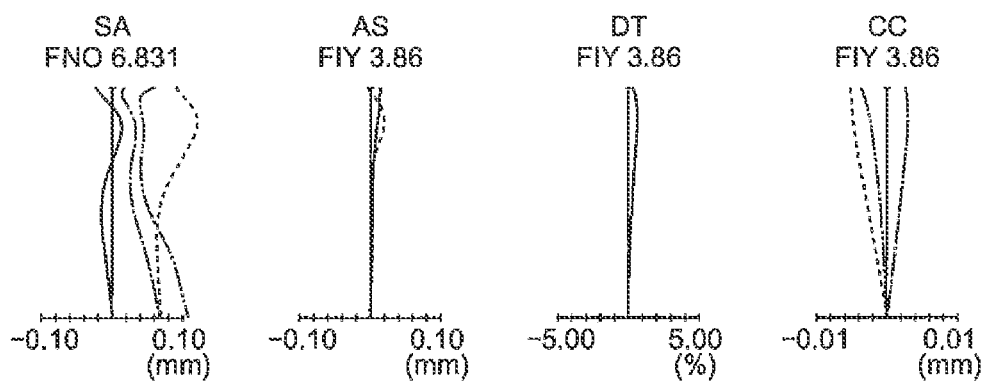

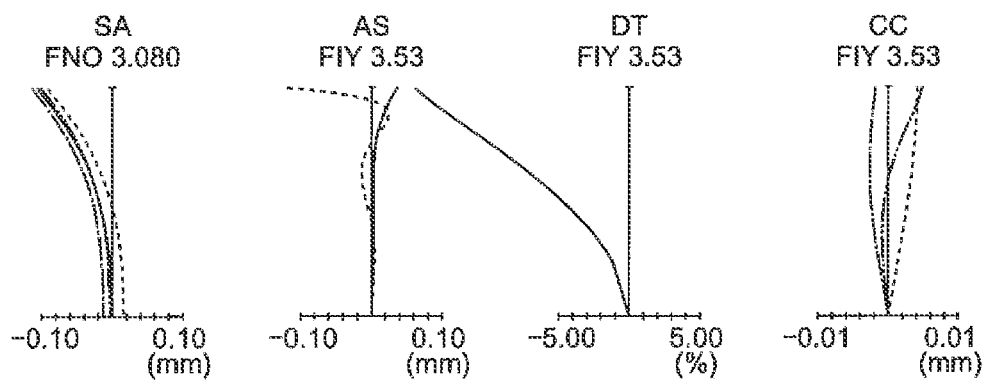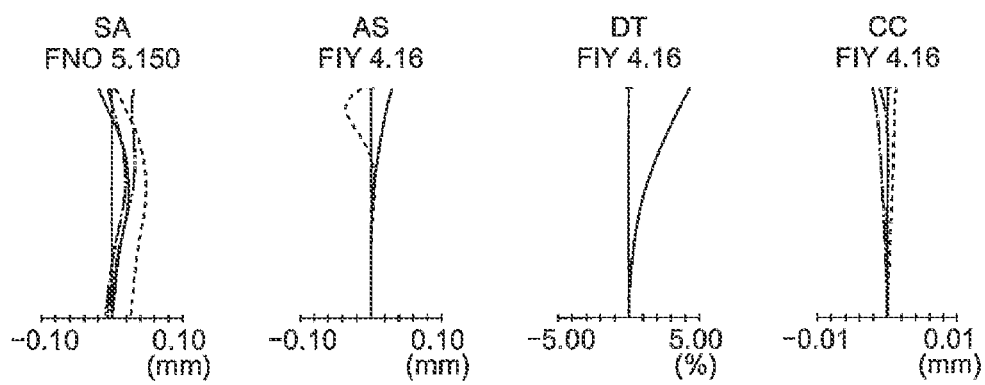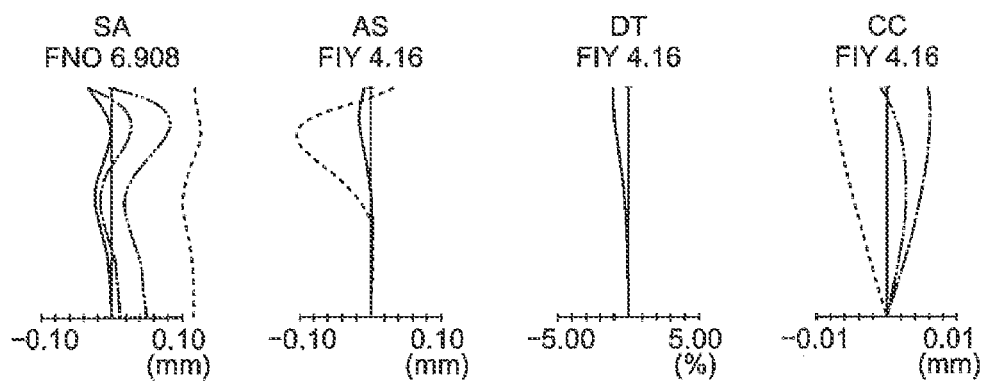

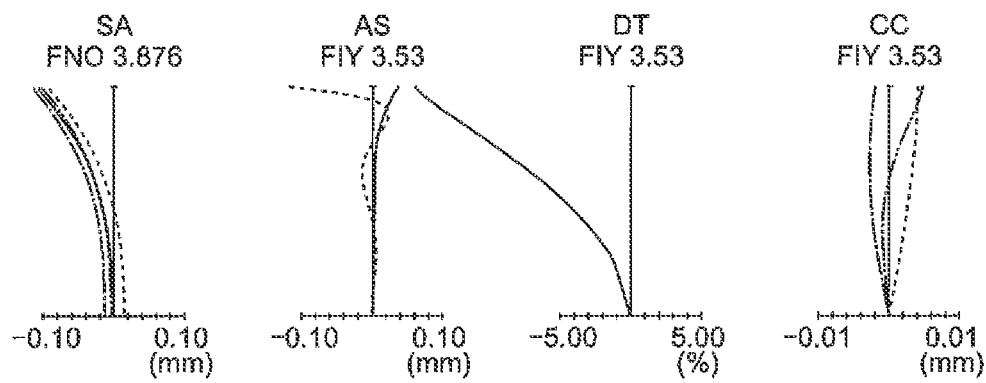
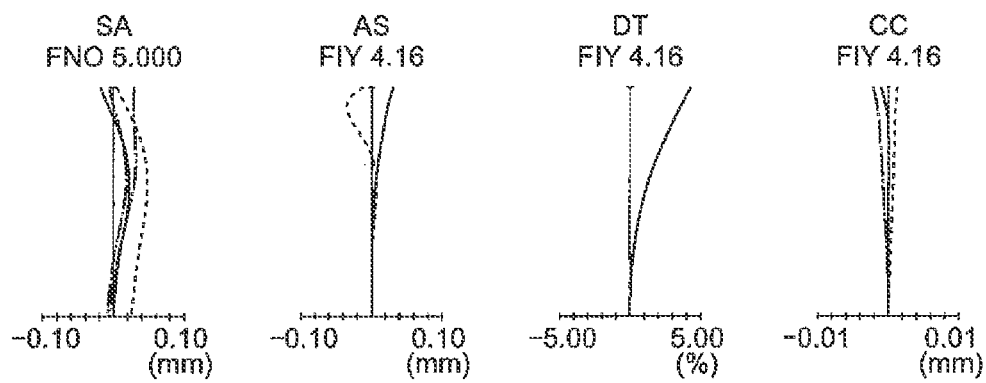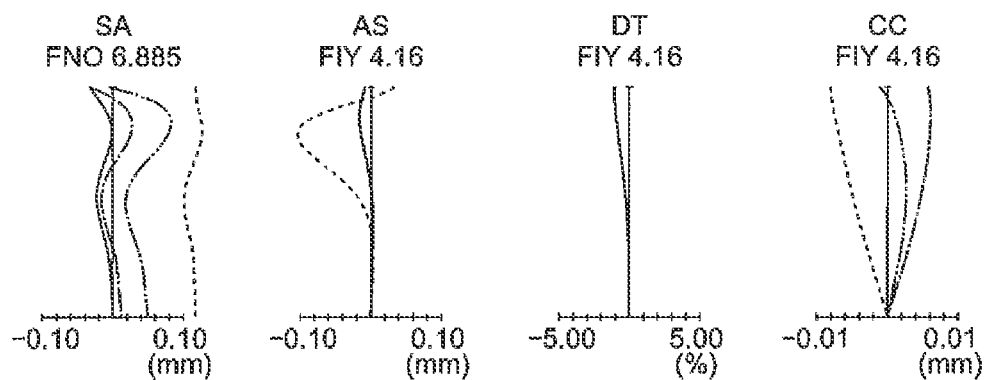

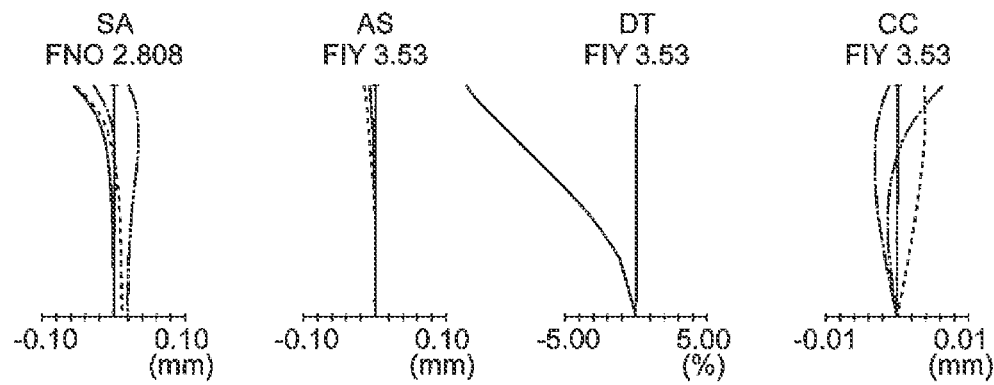
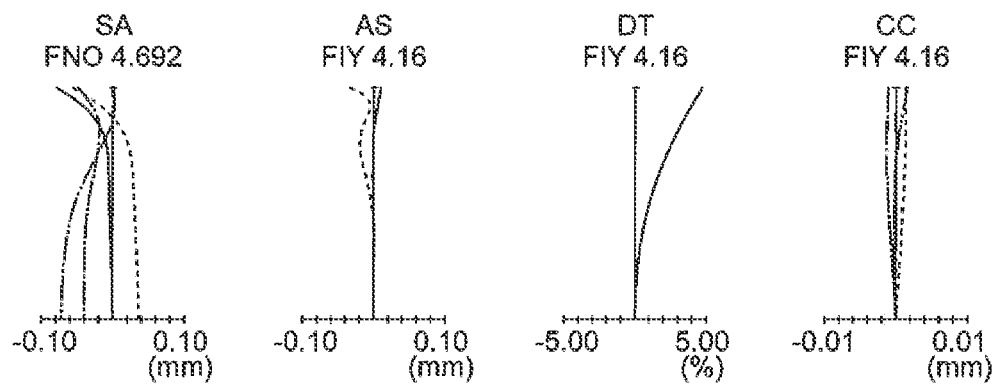
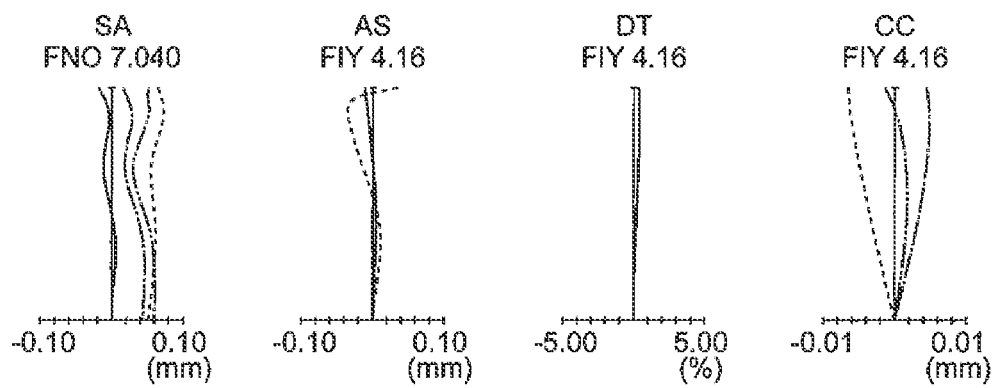

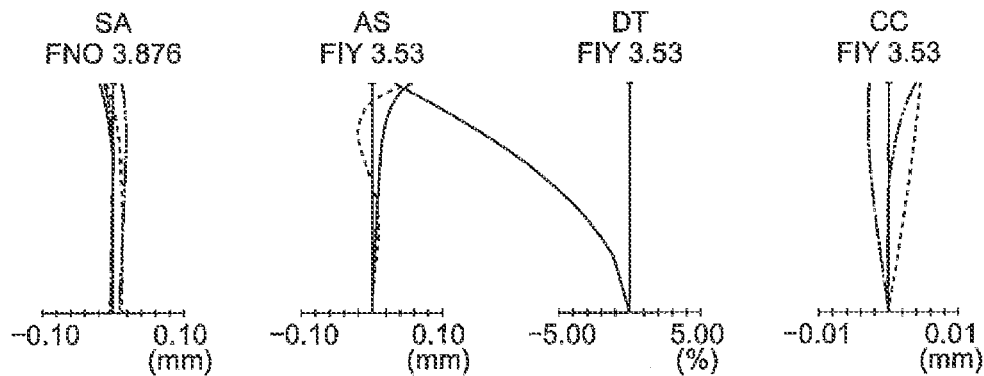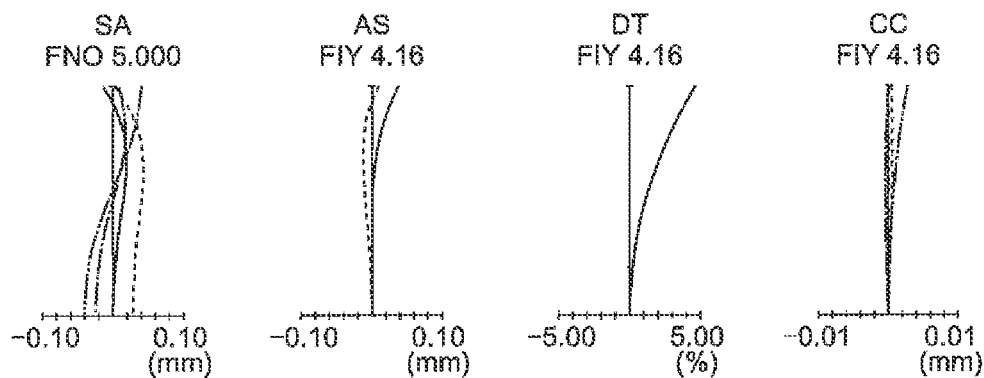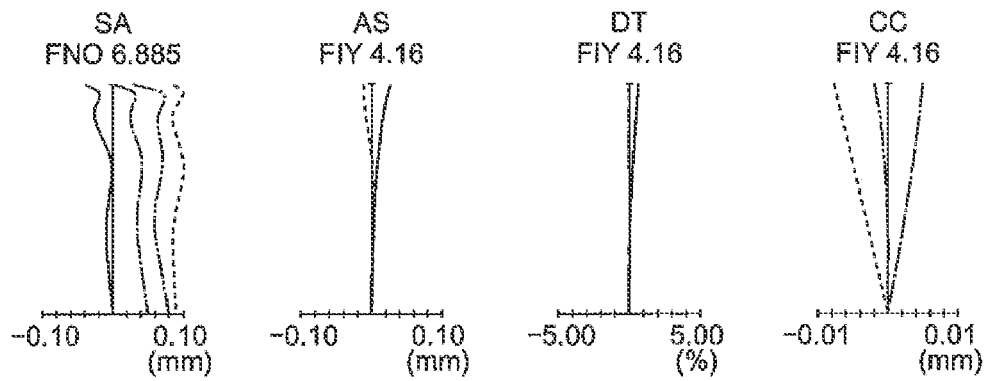

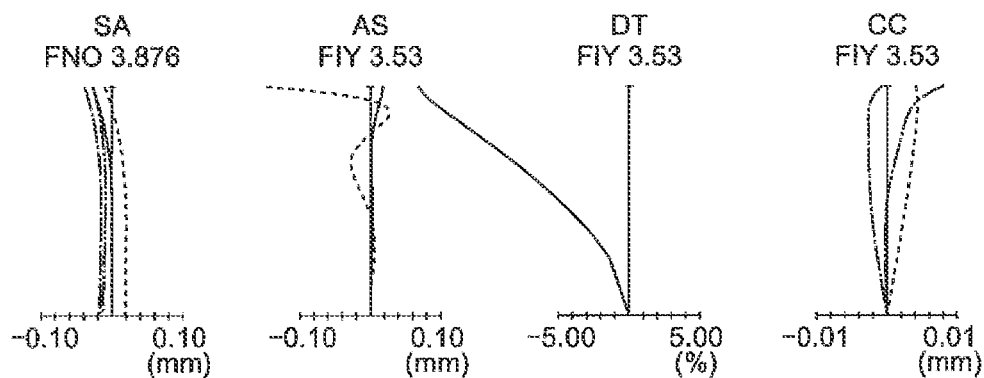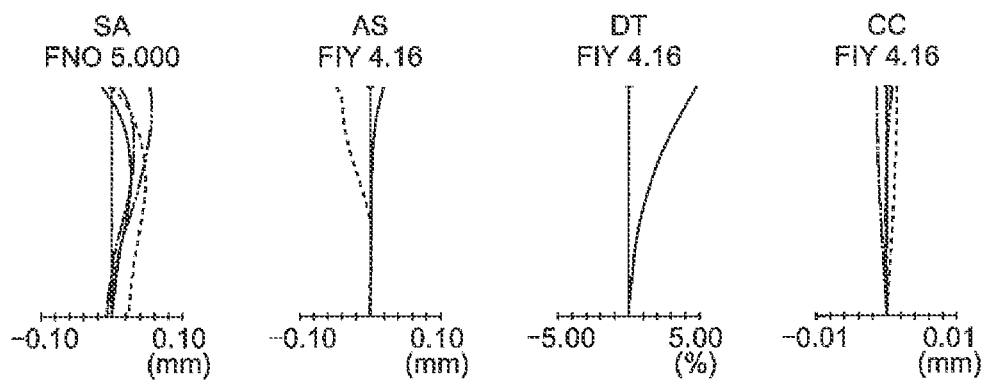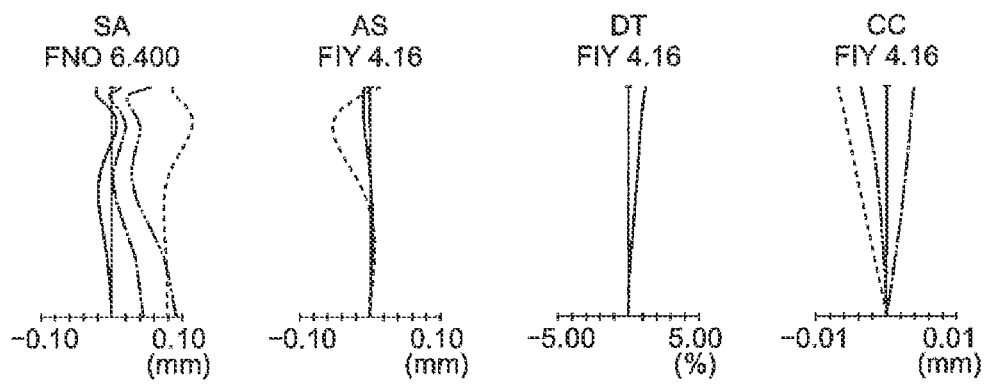

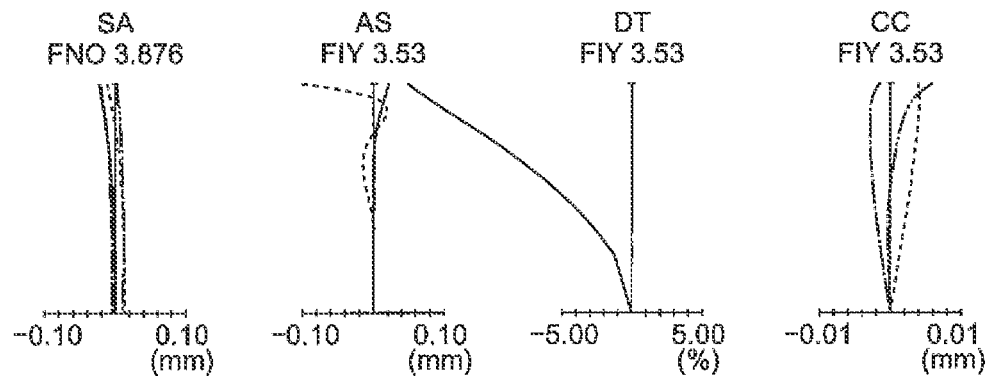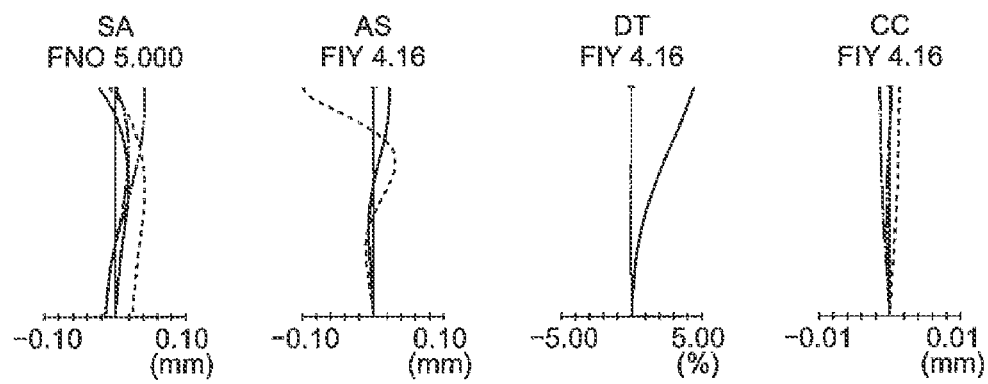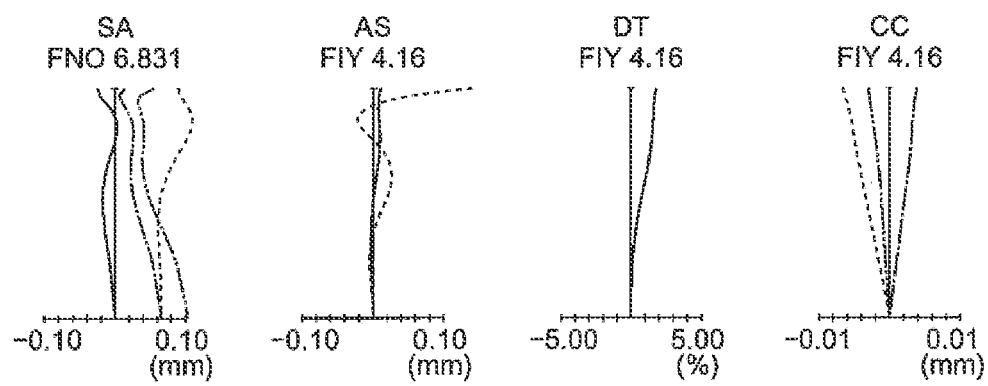

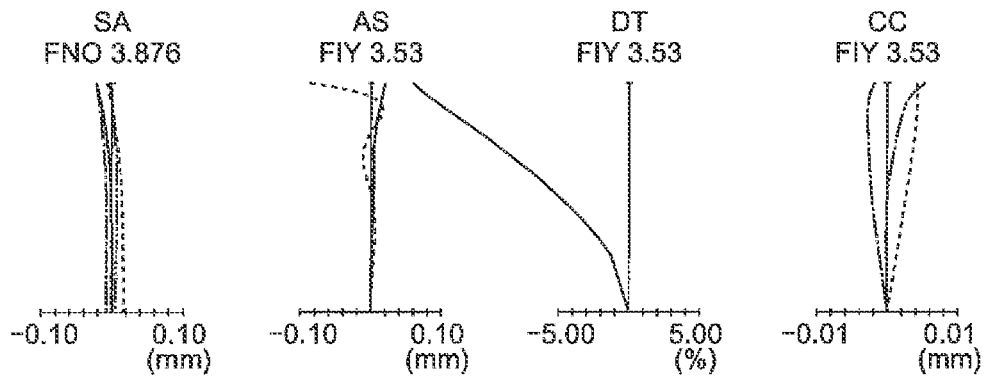
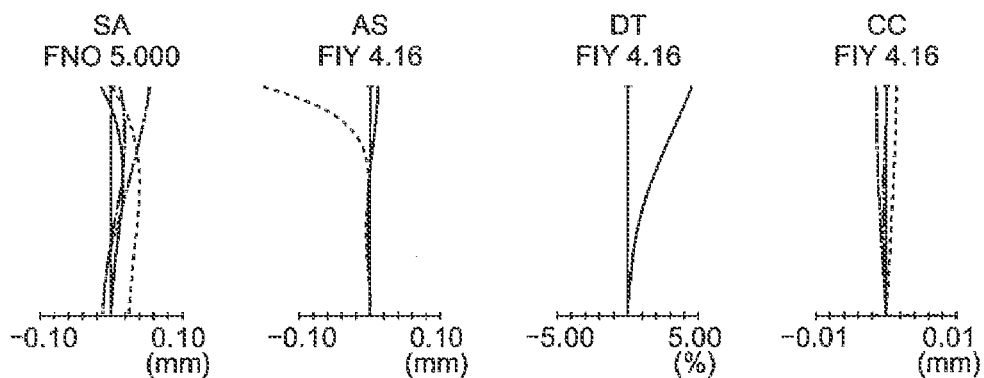
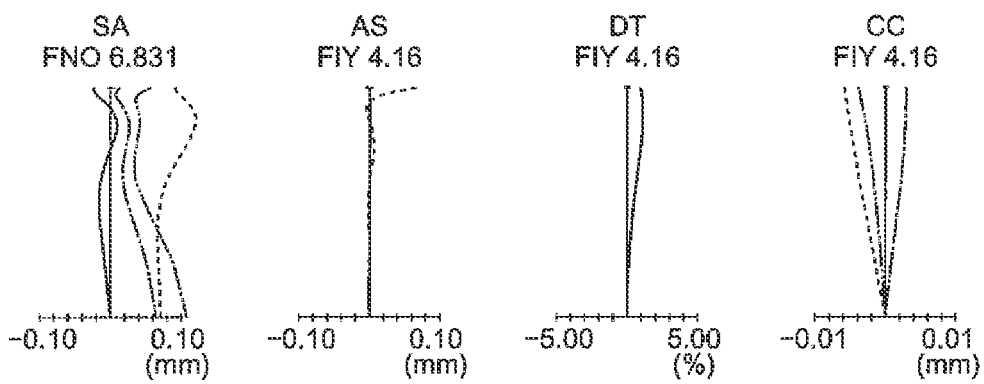

IMAGE PICKUP APPARATUS AND ZOOM LENS USED IN IMAGE PICKUP APPARATUS

CROSS-REFERENCE TO RELATED APPLICATION

The present application is a division of U.S. patent application Ser. No. 13/935,908 filed on Jul. 5, 2013, which is based upon and claims the benefit of priority from the prior Japanese Patent Application No. 2012-161533 filed on Jul. 20, 2012; the entire contents of which are incorporated herein by reference.

BACKGROUND OF THE INVENTION

Field of the Invention

The present invention relates to an image pickup apparatus and a zoom lens used in the image pickup apparatus.

Description of the Related Art

There has been known a zoom lens including a first positive lens unit having a positive refractive power located closest to the object side, a first negative lens unit having a negative refractive power arranged on the image side of the first positive lens unit, and an image side lens unit arranged on the image side of the first negative lens unit. An image pickup apparatus equipped with such a zoom lens has also been known. There are various types of zoom lenses used in image pickup apparatuses. Such zoom lenses having a high zoom ratio are disclosed in Japanese Patent Application Laid-Open Nos. 2011-90265, 2012-27308, 2009-251280, and 2011-48320.

SUMMARY OF THE INVENTION

An image pickup apparatus according to the present invention comprises:

a zoom lens, and an image pickup element arranged on the image side of the zoom lens, wherein the image pickup apparatus has an image pickup surface and converts an image formed by the zoom lens into an electrical signal, the zoom lens comprises a first positive lens unit having a positive refractive power located closest to the object side, a first negative lens unit having a negative refractive power arranged on the image side of the first positive lens unit, and an image side lens unit group arranged on the image side of the first negative lens unit, the first positive lens unit is located closer to the object side at the telephoto end than at the wide angle end, the distance between the first negative lens unit and the first positive lens unit is larger at the telephoto end than at the wide angle end, the distance between the image side lens unit group and the first negative lens unit varies during zooming from the wide angle end to the telephoto end, the image side lens unit group comprises a second positive lens unit having a positive refractive power and a third positive lens unit having a positive refractive power and arranged closer to the image side than the second positive lens unit, the distance between the second positive lens unit and the first negative lens unit is smaller at the telephoto end than at the wide angle end, the distance between the third positive lens unit and the second positive lens unit varies during zooming from the wide angle end to the telephoto end, the first positive lens unit comprises a plurality of positive lens and at least one negative lens, and the following conditional expressions (1), (2), and (3) are satisfied:

$$20<f_t/f_w<60 \tag{1}$$

$$32°<\arctan(IH_{MAX}/f_w)<55° \tag{2, and}$$

$$0.45<TL_t/f_t<0.70 \tag{3}$$

where $f_t$ is the focal length of the entire zoom lens system at the telephoto end, $f_w$ is the focal length of the entire zoom lens system at the wide angle end, $IH_{MAX}$ is the largest image height of the image formed on the image pickup surface or the largest value thereof if the value of the largest image height varies, $TL_t=TZL_t+FB_t$, where $TZL_t$ is the distance on the optical axis from the object side surface to the image side surface of the zoom lens at the telephoto end, and $FB_t$ is the back focus of the zoom lens at the telephoto end expressed in the equivalent air distance.

A zoom lens according to the present invention comprises:

a first positive lens unit having a positive refractive power located closest to the object side;

a first negative lens unit having a negative refractive power arranged on the image side of the first positive lens unit; and an image side lens unit group arranged on the image side of the first negative lens unit, wherein the first positive lens unit is located closer to the object side at the telephoto end than at the wide angle end, the distance between the first negative lens unit and the first positive lens unit is larger at the telephoto end than at the wide angle end, the distance between the image side lens unit group and the first negative lens unit varies during zooming from the wide angle end to the telephoto end, the image side lens unit group comprises a second positive lens unit having a positive refractive power and a third positive lens unit having a positive refractive power and arranged closer to the image side than the second positive lens unit, the distance between the second positive lens unit and the first negative lens unit is smaller at the telephoto end than at the wide angle end, the distance between the third positive lens unit and the second positive lens unit varies during zooming from the wide angle end to the telephoto end, the following conditional expressions (1), (3), and (A) are satisfied, and the first positive lens unit comprises a plurality of positive lenses, at least one of which satisfies the following conditional expression (4), and at least one negative lens:

$$20<f_t/f_w<60 \tag{1}$$

$$0.45<TL_t/f_t<0.70 \tag{3}$$

$$90<\nu d \tag{4, and}$$

$$S_{1P} \geq S_{1N} \geq S_{2P} > S_{3P} \tag{A}$$

where $f_t$ is the focal length of the entire zoom lens system at the telephoto end, $f_w$ is the focal length of the entire zoom lens system at the wide angle end, $TL_t=TZL_t+FB_t$, $TZL_t$ is the distance on the optical axis from the object side surface to the image side surface of the zoom lens at the telephoto end, $FB_t$ is the back focus of the zoom lens at the telephoto end expressed in the equivalent air distance, $\nu d$ is the Abbe constant with respect to the d-line of the positive lens in the first positive lens unit, $S_{1P}$ is the total number of lenses included in the first positive lens unit, $S_{1N}$ is the total number of lenses included in the first negative lens unit, $S_{2P}$ is the total number of lenses included in the second positive lens unit, and $S_{3P}$ is the total number of lenses included in the third positive lens unit.

An image pickup apparatus according to the present invention comprises:
the above-described zoom lens; and
an image pickup element arranged on the image side of the zoom lens,
wherein the image pickup has an image pickup surface and converts an image formed by the zoom lens into an electrical signal.

BRIEF DESCRIPTION OF THE DRAWINGS

FIGS. 1A and 1B are cross sectional view of a zoom lens according to a first example of the present invention in the state in which the zoom lens is focused on an object point at infinity respectively at the wide angle end and the telephoto end;

FIGS. 9A, 9B, 9C, 9D, 9E, 9F, 9G, 9H, 9I, 9J, 9K, and 9L are aberration diagrams of the zoom lens according to the first example in the state in which the zoom lens is focused at an object point at infinity;

FIGS. 10A, 10B, 10C, 10D, 10E, 10F, 10G, 10H, 10I, 10J, 10K, and 10L are aberration diagrams of the zoom lens according to the second example in the state in which the zoom lens is focused at an object point at infinity;

FIGS. 11A, 11B, 11C, 11D, 11E, 11F, 11G, 11H, 11I, 11J, 11K, and 11L are aberration diagrams of the zoom lens according to the third example in the state in which the zoom lens is focused at an object point at infinity;

FIGS. 12A, 12B, 12C, 12D, 12E, 12F, 12G, 12H, 12I, 12J, 12K, and 12L are aberration diagrams of the zoom lens according to the fourth example in the state in which the zoom lens is focused at an object point at infinity;

FIGS. 13A, 13B, 13C, 13D, 13E, 13F, 13G, 13H, 13I, 13J, 13K, and 13L are aberration diagrams of the zoom lens according to the fifth example in the state in which the zoom lens is focused at an object point at infinity;

FIGS. 14A, 14B, 14C, 14D, 14E, 14F, 14G, 14H, 14I, 14J, 14K, and 14L are aberration diagrams of the zoom lens according to the sixth example in the state in which the zoom lens is focused at an object point at infinity;

FIGS. 15A, 15B, 15C, 15D, 15E, 15F, 15G, 15H, 15I, 15J, 15K, and 15L are aberration diagrams of the zoom lens according to the seventh example in the state in which the zoom lens is focused at an object point at infinity;

FIGS. 16A, 16B, 16C, 16D, 16E, 16F, 16G, 16H, 16I, 16J, 16K, and 16L are aberration diagrams of the zoom lens according to the eighth example in the state in which the zoom lens is focused at an object point at infinity;

DETAILED DESCRIPTION OF THE INVENTION

Figure 2A:
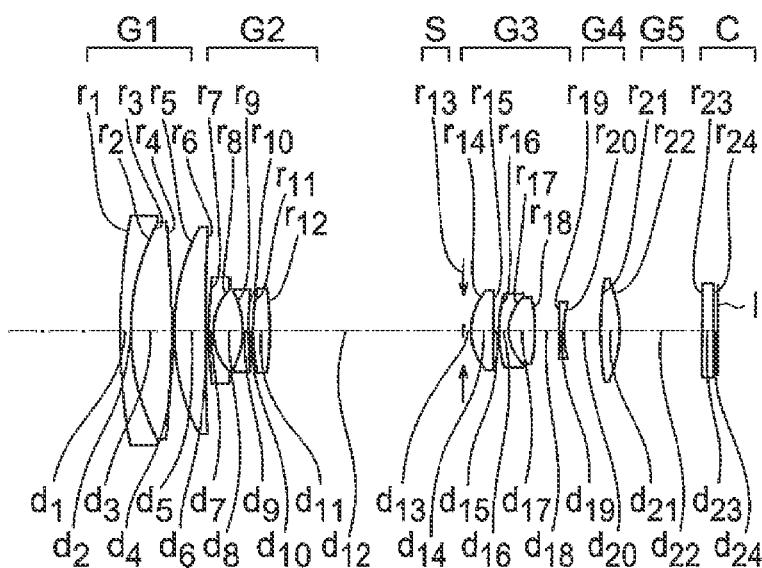
FIGS. 2A and 2B are cross sectional view of a zoom lens according to a second example of the present invention in the state in which the zoom lens is focused on an object point at infinity respectively at the wide angle end and the telephoto end.

In the following, some embodiments and examples of the image pickup apparatus and the zoom lens used in the image pickup apparatus according to the present invention will be described with reference to the drawings. It should be understood, however, that the present invention is by no means limited by the embodiments or examples.

An image pickup apparatus according to an embodiment of the invention includes a zoom lens and an image pickup element arranged on the image side of the zoom lens. The image pickup element has an image pickup surface and converts an image formed by the zoom lens into an electrical signal. The zoom lens includes a first positive lens unit having a positive refractive power located closest to the object side among the lens units in the zoom lens, a first negative lens unit having a negative refractive power arranged on the image side of the first positive lens unit, and an image side lens unit group arranged on the image side of the first negative lens unit.

In this zoom lens, the first positive lens unit is located closer to the object side at the telephoto end than at the wide angle end, the distance between the first negative lens unit and the first positive lens unit is larger at the telephoto end than at the wide angle end, and the distance between the image side lens unit group and the first negative lens unit varies during zooming from the wide angle end to the telephoto end.

As described above, the first positive lens unit moves during zooming in such a way that it is located closer to the object side at the telephoto end than at the wide angle end. This can lead to a reduction in the overall length of the zoom lens. This consequently allows the optical system to have a wide angle of view while keeping the effective diameter of the first positive lens unit small. The above-described movement of the first positive lens unit helps to reduce the diameter of the first positive lens unit and the widening of the angle of view.

Moreover, varying the distances between the lens units in the above-described manner enables the first negative lens unit and the second positive lens unit to contribute to the variation of the magnification. Therefore, the above-described variations in the distances helps to achieve an adequate zoom ratio.

In this zoom lens, moreover, the image side lens unit group includes a second positive lens unit having a positive refractive power, a third positive lens unit having a positive refractive power and arranged closer to the image side than the second positive lens unit, the distance between the second positive lens unit and the first negative lens unit is smaller at the telephoto end than at the wide angle end, and the distance between the third positive lens unit and the second positive lens unit varies during zooming from the wide angle end to the telephoto end.

Including the third positive lens unit in the image side lens unit group helps to shift the position of the exit pupil away from the image plane (or the image pickup surface).

In this zoom lens, moreover, the first positive lens unit includes a plurality of positive lenses and at least one negative lens. As the first positive lens unit includes a plurality of positive lenses, the first positive lens unit can have an appropriate positive refractive power. As the first positive lens unit includes a negative lens, chromatic aberration can be corrected excellently in the first positive lens unit.

In the image pickup apparatus according to this embodiment, the following conditional expressions (1), (2), and (3) are satisfied:

$$20 < f_t/f_w < 60 \quad (1),$$

$$32° < \arctan(IH_{MAX}/f_w) < 55° \quad (2), \text{ and}$$

$$0.46 < TL_t/f_t < 0.70 \quad (3),$$

where $f_t$ is the focal length of the entire zoom lens system at the telephoto end, $f_w$ is the focal length of the entire zoom lens system at the wide angle end, $IH_{MAX}$ is the largest image height of the image formed on the image pickup surface or the largest value thereof if the value of the largest image height varies, $TL_t = TZL_t + FB_t$, where $TZL_t$ is the distance on the optical axis from the object side surface to the image side surface of the zoom lens at the telephoto end, and $FB_t$ is the back focus of the zoom lens at the telephoto end expressed in the equivalent air distance.

Conditional expression (1) specifies a preferred range of the zoom ratio of the zoom lens. If the term in conditional expression (1) has a value not smaller than the lower limit, angles of view suitable for various shooting situations will be available. On the other hand, if the term in conditional expression (1) has a value not larger than the upper limit, the zoom lens can have sufficient brightness, or speed at the telephoto end.

Conditional expression (2) specifies a preferred range of the focal length at the wide angle end of the zoom lens. If the term in conditional expression (2) has a value not smaller than the lower limit, angles of view suitable for various shooting situations will be available. On the other hand, if the term in conditional expression (2) has a value not larger than the upper limit, reduction of the diameter of the first positive lens unit and reduction of off-axis aberrations in the focal length range near the wide angle end will be facilitated.

In some zoom lenses, the height of the image formed on the image pickup surface is varied with zooming. For example, the image height at the wide angle end is intentionally made smaller than the image height at the telephoto end or at an intermediate focal length state, and images picked up at the wide angle end is processed by image processing to have an image height equal to the image height at the telephoto end or at the intermediate focal length state. In the case of zoom lenses in which the image height varies with zooming, the value of $IH_{MAX}$ is the largest value of the varying image height.

Conditional expression (3) specifies a preferred range of the telephoto ratio of the zoom lens at the telephoto end. If the term in conditional expression (3) has a value not smaller than the lower limit, reduction of axial chromatic aberration in the focal length range near the telephoto end will be facilitated. On the other hand, if the term in conditional expression (3) has a value not larger than the upper limit, the amount of movement of the first lens unit can be reduced. Consequently, the size of the zoom lens can be made small throughout the entire zoom range (from the wide angle end to the telephoto end). Therefore, not exceeding the upper limit of conditional expression (3) helps to reduce the size of the image pickup apparatus including the lens barrel.

In the image pickup apparatus according to this embodiment, it is preferred that the total number of lenses located closer the to the image side than the first negative lens unit be equal to or less than 7.

Reduction in the total number of lenses helps to reduce the overall length of the zoom lens and reduction in the cost.

It is preferred that the total number of lenses located closer to the image side than the first negative lens unit be equal to or less than 6. It is more preferred that the total number of lenses located closer to the image side than the first negative lens unit be equal to or less than 5.

In the image pickup apparatus according to this embodiment, it is preferred that the first positive lens unit include at least one positive lens that satisfies the following conditional expression (4):

$$90 < vd \quad (4),$$

where vd is the Abbe constant with respect to the d-line of the positive lens in the first positive lens unit.

The high refractive power of the first positive lens unit helps to maintain the low telephoto ratio and achieving a sufficiently high zoom ratio. However, the high refractive power of the first positive lens unit tends to lead to generation of chromatic aberration in the first positive lens unit. Therefore, in order to reduce chromatic aberration involved by the high refractive power, it is preferred that a positive lens that satisfies conditional expression (4), i.e. a positive lens with low dispersion, be used in the first positive lens unit.

Including at least one positive lens that satisfies conditional expression (4) in the first positive lens unit helps to reduce chromatic aberration generated in the first positive lens unit. Inconsequence, the optical performance (or imaging performance) of the zoom lens can be improved, leading to an improvement in the image quality in the image pickup apparatus. For the above reason, using the positive lens that satisfies conditional expression (4) helps to improve the image quality in the image pickup apparatus that satisfies the above-mentioned conditional expressions (1) to (3).

In the image pickup apparatus according to this embodiment, it is preferred that a specific positive lens having the largest thickness on the optical axis among the positive lenses in the first positive lens unit satisfy conditional expression (4).

The first positive lens unit includes a plurality of positive lenses. If the specific lens among them or the positive lens having the largest thickness on the optical axis is a lens that satisfies conditional expression (4), it is easy to design this lens to have a high positive refractive power. Consequently, the optical performance of the zoom lens can be improved, enabling improvement in the image quality in the image pickup apparatus. Therefore, the specific positive lens satisfying conditional expression (4) helps to improve both the optical performance and the image quality.

In the image pickup apparatus according to this embodiment, it is preferred that the first positive lens unit be composed of two positive lenses and one negative lens and that a specific positive lens having the largest thickness on the optical axis among the positive lenses in the first positive lens unit satisfy the following conditional expression (5):

$$0.25 d_{P1P}/D_{1P}<0.55 \quad (5),$$

where $d_{P1P}$ is the thickness of the specific positive lens on the optical axis, and $D_{1P}$ is the thickness of the first positive lens unit on the optical axis.

As the first positive lens unit is composed of three lenses, the first positive lens unit can be made slim. When the first positive lens unit is composed of three lenses, it is preferred that a specific lens or the positive lens that has the largest thickness on the optical axis satisfy conditional expression (5). This allows the first positive lens unit to have an sufficiently high positive refractive power. The number of positive lenses satisfying conditional expression (5) may be either one or two.

Not falling short of the lower limit of conditional expression (5) helps to design the first positive lens unit to have a sufficiently high refractive power. On the other hand, if the term in conditional expression (5) has a value not larger than the upper limit, both of the two positive lenses can contribute to the positive refractive power. Therefore, not exceeding the upper limit of conditional expression (5) helps to correct aberrations in the first positive lens unit.

In the image pickup apparatus according to this embodiment, it is preferred that the first positive lens unit include four lenses.

Including a relatively large number of lenses in the first positive lens unit helps to design the first positive lens unit to have a sufficiently high refractive power and to reduce aberrations. This configuration may be adopted in the zoom lens according to another embodiment that will be described later.

Moreover, in the image pickup apparatus according to this embodiment, it is preferred that at least two positive lenses among the four lenses satisfy the following conditional expression (4):

$$90<vd \quad (4),$$

where vd is the Abbe constant with respect to the d-line of the positive lenses in the first positive lens unit.

If at least two lenses among the four lenses satisfy conditional expression (4), chromatic aberration generated in the first positive lens unit can be reduced, and the first positive lens unit can be designed to have a sufficiently high positive refractive power. Therefore, including at least two lenses that satisfy conditional expression (4) further helps to design the first positive lens unit to have a sufficiently high refractive power and to reduce aberrations. In the zoom lens according to the later described embodiment also, it is preferred that conditional expression (4) be satisfied.

In the image pickup apparatus according to this embodiment, it is preferred that the image side lens unit group include a second negative lens unit having a negative refractive power arranged between the second positive lens unit and the third positive lens unit and that the distance between the second negative lens unit and the second positive lens unit and the distance between the second negative lens unit and the third positive lens unit vary during zooming from the wide angle end to the telephoto end.

In the above configuration, off-axis beams emergent from the second positive lens unit are refracted by the second negative lens unit in directions away from the optical axis. Thereafter, the off-axis beams emergent from the second negative lens unit are refracted by the third positive lens unit (in directions approaching the optical axis) to travel toward the image pickup surface. Therefore, this configuration helps to reduce the size of portion of the optical system on the object side of the second negative lens unit. Moreover, the second negative lens unit can be designed to function as a compensator, leading to improvement in the design flexibility. It is preferred that this configuration be adopted in the zoom lens according to the later-described embodiment.

In the image pickup apparatus according to this embodiment, it is preferred that the following conditional expressions (A) and (B) be satisfied:

$$S_{1P} \geq S_{1N} \geq S_{2P} > S_{3P} \quad \text{(A), and}$$

$$S_{1P} \geq S_{1N} \geq S_{2P} > S_{2N} \quad \text{(B)},$$

where $S_{1P}$ is the total number of lenses included in the first positive lens unit, $S_{1N}$ is the total number of lenses included in the first negative lens unit, $S_{2P}$ is the total number of lenses included in the second positive lens unit, $S_{2N}$ is the total number of lenses included in the second negative lens unit, and $S_{3P}$ is the total number of lenses included in the third positive lens unit.

The zoom lens includes lens units that greatly contribute to size reduction of the optical system and to high zoom ratio and lens units that do not (lens units that do not greatly contribute to size reduction of the optical system and to high zoom ratio). It is preferred that the lens units that greatly contribute to size reduction of the optical system and to high zoom ratio be designed to include a larger number of lenses in total in order to have a sufficiently high refractive power and to enable reduction of aberrations and that the lens units that do not be designed to include a smaller number of lenses to thereby reduce the cost of the optical system.

If one of conditional expressions (A) and (B) is satisfied, the lens units including larger numbers of lenses are arranged closer to the object side, and the lens unit including smaller numbers of lenses are arranged closer to the image side. Consequently, each lens unit can be designed to have an appropriate refractive power, and reduction of aberrations and cost reduction can be achieved. If conditional expressions (A) and (B) are both satisfied, the above advantages can be achieved more effectively. In the zoom lens according to the later described embodiment also, it is preferred that the conditional expression (B) be satisfied.

In the image pickup apparatus according to this embodiment, it is preferred that the second negative lens unit include a negative lens that satisfies the following conditional expression (6) and that the second negative lens unit move toward the image side during focusing from infinity to a short distance:

$$70<vd_{N2N} \quad (6),$$

where $vd_{N2N}$ is the Abbe constant of the negative lens in the second negative lens unit with respect to the d-line.

If conditional expression (6) is satisfied, chromatic aberration generated in the second negative lens unit can be made small. In addition, satisfying conditional expression (6) helps to reduce the number of lenses included in the second negative lens unit and to reduce the weight of the second negative lens unit.

If conditional expression (6) is satisfied, the second negative lens unit can be made small and light in weight, allowing the second negative lens unit to serve as a focusing lens unit. This helps to reduce the load on driving unit for focusing. As a lens unit is moved, the size of the image (on the image pickup surface) generally changes with the movement of the lens unit. In the case where the second negative unit is moved, such change in the size can be made small. For this reason, the second negative lens unit is preferably used as the focusing lens unit in video shooting.

In the image pickup apparatus according to this embodiment, it is preferred that following conditional expressions (7) and (8) be satisfied:

$$0.1 < f_{1P}/f_t < 0.5 \quad (7), \text{ and}$$

$$-0.15 < f_{1N}/f_t < -0.02 \quad (8),$$

where $f_{1P}$ is the focal length of the first positive lens unit, $f_{1N}$ is the focal length of the first negative lens unit, and $f_t$ is the focal length of the entire zoom lens system at the telephoto end.

Conditional expressions (7) and (8) specify preferred ranges of the focal lengths of the first positive lens unit and the first negative lens unit respectively. It is preferred that one or both of conditional expressions (7) and (8) be satisfied. In the zoom lens according to the later-described embodiment also, it is preferred that conditional expressions (7) and (8) be satisfied.

Not falling short of the lower limit of conditional expression (7) helps to reduce chromatic aberration in the entire zoom lens (i.e. to control the generation of chromatic aberration). On the other hand, not exceeding the upper limit of conditional expression (7) helps to reduce the overall length of the zoom lens in the focal length range near the telephoto end and to achieve an appropriate zoom ratio.

Not falling short of the lower limit of conditional expression (8) helps to achieve a sufficiently large angle of view at the wide angle end and to achieve an appropriate zoom ratio. Moreover, not falling short of the lower limit of conditional expression (8) also helps to reduce (or to control the generation of) curvature of field and chromatic aberration in the entire zoom lens. On the other hand, not exceeding the upper limit of conditional expression (8) helps to control variation of aberrations, in particular variation of curvature of field, with zooming.

In the image pickup apparatus according to this embodiment, it is preferred that the following conditional expressions (9) and (11) be satisfied:

$$0.05 < f_{2P}/f_t < 0.15 \quad (9), \text{ and}$$

$$0.05 f_{3P}/f_t < 0.20 \quad (11),$$

where $f_{2P}$ is the focal length of the second positive lens unit, $f_{3P}$ is the focal length of the third positive lens unit, and $f_t$ is the focal length of the entire zoom lens system at the telephoto end.

Conditional expressions (9) and (11) specify preferred ranges of the focal lengths of the second positive lens unit and the third positive lens unit respectively. It is preferred that one or both of conditional expressions (9) and (11) be satisfied.

Not falling short of the lower limit of conditional expression (9) helps to reduce (or to control the generation of) spherical aberration in the focal length range near the telephoto end. On the other hand, not exceeding the upper limit of conditional expression (9) helps to achieve appropriate magnification variation by the second positive lens unit.

Not falling short of the lower limit of conditional expression (11) helps to reduce the tilt of the image plane toward the object side. On the other hand, not exceeding the upper limit of conditional expression (11) helps to shift the position of the exit pupil away from the image plane. In cases where the third positive lens unit is moved to vary the magnification, not exceeding the upper limit of conditional expression (11) helps to achieve appropriate magnification variation by the third positive lens unit.

In the image pickup apparatus according to this embodiment, it is preferred that the following conditional expressions (7), (8), (9), (10), and (11) be satisfied:

$$0.1 < f_{1P}/f_t < 0.5 \quad (7),$$

$$-0.15 < f_{1N}/f_t < -0.02 \quad (8),$$

$$0.05 < f_{2P}/f_t < 0.15 \quad (9),$$

$$-0.25 < f_{2N}/f_t < -0.05 \quad (10), \text{ and}$$

$$0.05 f_{3P}/f_t < 0.20 \quad (11),$$

where $f_{1P}$ is the focal length of the first positive lens unit, $f_{1N}$ is the focal length of the first negative lens unit, $f_{2P}$ is the focal length of the second positive lens unit, $f_{2N}$ is the focal length of the second negative lens unit, $f_{3P}$ is the focal length of the third positive lens unit, and $f_t$ is the focal length of the entire zoom lens system at the telephoto end.

Conditional expressions (7), (8), (9), (10), and (11) specify preferred ranges of the focal lengths of the first positive lens unit, the first negative lens unit, the second positive lens unit, the second negative lens unit, and the third positive lens unit respectively.

Technical meaning of conditional expressions (7), (8), (9), and (11) have been described above.

Not falling short of the lower limit of conditional expression (10) helps to reduce the diameter of the zoom lens. On the other hand, not exceeding the upper limit of conditional expression (10) helps to reduce (or control the generation of) coma, curvature of field, and spherical aberration in the second negative lens unit. In addition, not exceeding the upper limit of conditional expression (10) helps to reduce variation in aberrations, in cases where the second negative lens unit is used as a focusing lens unit.

In the image pickup apparatus according to this embodiment, it is preferred that the following conditional expression (12) be satisfied:

$$0.12 < D_{1P}/TL_w \quad (12),$$

where $D_{1P}$ is the thickness of the first positive lens unit on the optical axis, and $TL_w = TZL_w + FB_w$, where $TZL_w$ is the distance on the optical axis from the object side surface to the image side surface of the zoom lens at the wide angle end, and $FB_w$ is the back focus of the zoom lens at the wide angle end expressed in the equivalent air distance.

It is preferred that the thickness of the first positive lens unit on the optical axis be so large that the term in conditional expression (12) has a value not smaller than the lower limit. This helps to increase the flexibility of the lens configuration. Not falling short of the lower limit of conditional expression (12) helps to design the first positive lens unit to have a sufficiently high refractive power while reducing aberrations. In the zoom lens according to the later-described embodiment also, it is preferred that conditional expression (12) be satisfied.

In the image pickup apparatus according to this embodiment, it is preferred that the following conditional expression (13) be satisfied:

$$1.2 < D_{1P}/D_{1N} \quad (13),$$

where $D_{1P}$ is the thickness of the first positive lens unit on the optical axis, and $D_{1N}$ is the thickness of the first negative lens unit on the optical axis.

It is preferred that the thickness of the first positive lens unit on the optical axis be so large that the term in conditional expression (13) has a value not smaller than the lower limit. This helps to increase the flexibility of the lens configuration. Not falling short of the lower limit of conditional expression (13) helps to design the first positive lens unit to have a sufficiently high refractive power while reducing aberrations.

It is preferred that the thickness of the first negative lens unit on the optical axis be so small that the term in conditional expression (13) has a value not smaller than the lower limit. This helps to provide an appropriate variable air distances in front and rear of the first negative lens unit. Not falling short of the lower limit of conditional expression (13) helps to achieve an appropriate zoom ratio and to reduce the size of the zoom lens and the image pickup apparatus. In the zoom lens according to the later-described embodiment also, it is preferred that conditional expression (13) be satisfied.

In the image pickup apparatus according to this embodiment, it is preferred that the following conditional expression (14) be satisfied:

$$0.4 < (TL_t - TL_w)/TL_w \quad (14),$$

where $TL_t = TZL_t + FB_t$, and $TL_w = TZL_w + FB_w$, where $TZL_t$ is the distance on the optical axis from the object side surface to the image side surface of the zoom lens at the telephoto end, $FB_t$ is the back focus of the zoom lens at the telephoto end expressed in the equivalent air distance, $TZL_w$ is the distance on the optical axis from the object side surface to the image side surface of the zoom lens at the wide angle end, and $FB_w$ is the back focus of the zoom lens at the wide angle end expressed in the equivalent air distance.

Conditional expression (14) specifies a preferred range of the amount of shift of the first positive lens unit. It is preferred that the amount of shift of the first positive lens unit be so large that the term in conditional expression (14) has a value not smaller than the lower limit. Not falling short of the lower limit of conditional expression (14) helps to reduce the overall length of the zoom lens at the wide angle end, to reduce the effective diameter, and to achieve a sufficiently large angle of view. In the zoom lens according to the later-described embodiment also, it is preferred that conditional expression (14) be satisfied.

In the image pickup apparatus according to this embodiment, it is preferred that the following conditional expression (15) be satisfied:

$$2.0 < ME_{1Pw}/ME_{1Nw} \quad (15),$$

where $ME_{1Pw}$ is the maximum effective diameter of the object side surface of the first positive lens unit at the wide angle end, and $ME_{1Nw}$ is the maximum effective diameter of the object side surface of the first negative lens unit at the wide angle end.

It is preferred that the maximum effective diameter of the first positive lens be so large that the term in conditional expression (15) has a value not smaller than the lower limit. Not falling short of the lower limit of conditional expression (15) helps to achieve an appropriate angle of view at the wide angle end and appropriate brightness (or speed) at the telephoto end. The maximum effective diameter refers to the diameter of the bundle of effective beams on the subject surface, where effective beams refer to the beams used in forming an image. In the zoom lens according to the later-described embodiment also, it is preferred that conditional expression (15) be satisfied.

In the image pickup apparatus according to this embodiment, it is preferred that the image side lens unit group include a focusing lens unit, that during focusing from infinity to a first extremely close distance, the focusing lens unit move while the first positive lens unit, the first negative lens unit, and the second positive lens unit are stationary, and that during focusing to a second extremely close distance shorter than the first extremely close distance, the first positive lens unit move toward the object side while the first negative lens unit and the second positive lens unit are stationary.

For focusing from an object at infinity to an object at the first extremely close distance, it is preferred that a lens unit in the image side lens unit group be used. More specifically, if the focusing operation includes focusing onto an object at infinity, it is preferred that the focusing lens unit be included in the image side lens unit group and that a lens unit other than the second positive lens unit be used as a focusing lens unit. This design helps to reduce the weight of the focusing lens unit. Moreover, with the reduction in the weight of the focusing lens unit, the sound generated by the movement of the focusing lens unit can be reduced. Thus, the reduction in the weight of the focusing lens unit leads to a reduction in noises generated during video shooting.

Advancing the first positive lens unit enables focusing on an object at a further shorter distance. This distance (second extremely close distance) is shorter from the image pickup apparatus than the first extremely close distance. It is preferred that the direction in which the first positive lens unit is advanced be the direction toward the object side. While the first positive lens unit is advanced, the first negative lens and the second positive lens are stationary.

It is preferred that the first positive lens have a sufficiently high refractive power and be configured to have high optical performance. This further helps to achieve appropriate magnification in short distance shooting while maintaining high optical performance. In the zoom lens according to the later-described embodiment also, it is preferred that this feature be satisfied. In the case of the zoom lens according to the later-described embodiment, it is preferred that the focusing lens unit be the second negative lens unit.

In the image pickup apparatus according to this embodiment, it is preferred that focusing to the second extremely close distance be performed in a certain zoom range (focal length range) that does not include the telephoto end, and that the first positive lens unit come closest to the object side when the zoom lens is focused at infinity at the telephoto end.

The first positive lens unit is located closer to the object side at the telephoto end than at the wide angle end. In consequence, if focusing to an object at the second extremely close distance is performed at the telephoto end, it is necessary to further move the first positive lens unit toward the object side. This will necessitate an increase in the overall length of the optical system. In view of this, focusing onto an object at the second close distance be performed in a zoom range (focal length range) that does not include the telephoto end, namely a zoom range away from the telephoto end toward the wide angle end. In addition, it is preferred that the first positive lens unit come closest to the object side when the zoom lens is focused on an object at infinity at the telephoto end.

With the above arrangement, the range of movement of the first positive lens unit can be made small. Specifically, when the zoom lens is focused on an object at the second close distance, the first positive lens unit does not need to come closer to the object side than its position taken at the time when zoom lens is focused on an object at infinity at the telephoto end. The above-described way of moving the first positive lens unit helps to reduce the size of the optical system.

In the image pickup apparatus according to this embodiment, it is preferred that the first positive lens unit include a first positive lens, a second positive lens arranged closer to the image side than the first positive lens, and a third positive lens arranged closer to the image side than the second positive lens and that the following conditional expression (16) be satisfied:

$$-1.85 < SF_3 < SF_2 < SF_1 < -0.7 \quad (16),$$

where $SF_2=(r_{OL1}+r_{IL1})/(r_{OL1}-r_{IL1})$, $SF_2=(r_{OL2}+r_{IL2})/(r_{OL2}-r_{IL2})$, and $SF_3=(r_{OL3}+r_{IL3})/(r_{OL3}-r_{IL3})$, where $SF_n$ is the shape factor of the n-th positive lens, $r_{OLn}$ is the paraxial radius of curvature of the object side refractive surface of the n-th positive lens, and $r_{ILn}$ is the paraxial radius of curvature of the image side refractive surface of the n-th positive lens (n=1, 2, 3).

If the first positive lens unit includes three positive lenses, the three positive lenses can contribute to the positive refractive power of the first positive lens unit. Satisfying conditional expression (16) helps to reduce spherical aberration in the focal length range near the telephoto end, in which the exit pupil becomes large. Including three positive lenses in the first positive lens unit and satisfying conditional expression (16) help to increase the positive refractive power and while reducing spherical aberration, in the first positive lens unit.

It is preferred that the curvature of the image side surface of the third positive lens be so low (i.e. the radius of curvature be so large) that the value of $SF_3$ does not become smaller than the lower limit of conditional expression (16). Not falling short of the lower limit of conditional expression (16) helps to reduce spherical aberration. On the other hand, it is preferred that the angle of incidence of off-axis beams on the first positive lens be so small that the value of $SF_3$ does not become larger than the upper limit of conditional expression (16). Not exceeding the upper limit of conditional expression (16) helps to reduce curvature of field.

It is preferred that a zoom lens according to an embodiment include a first positive lens unit having a positive refractive power located closest to the object side among the lens units in the zoom lens, a first negative lens unit having a negative refractive power arranged on the image side of the first positive lens unit, and an image side lens unit group arranged on the image side of the first negative lens unit, wherein the first positive lens unit is located closer to the object side at the telephoto end than at the wide angle end, the distance between the first negative lens unit and the first positive lens unit is larger at the telephoto end than at the wide angle end, the distance between the image side lens unit group and the first negative lens unit varies during zooming from the wide angle end to the telephoto end, the image side lens unit group includes a second positive lens unit having a positive refractive power and a third positive lens unit having a positive refractive power and arranged closer to the image side than the second positive lens unit, the distance between the second positive lens unit and the first negative lens unit is smaller at the telephoto end than at the wide angle end, the distance between the third positive lens unit and the second positive lens unit varies during zooming from the wide angle end to the telephoto end, the following conditional expressions (1), (3), and (A) are satisfied, and the first positive lens unit includes a plurality of positive lenses, at least one of which satisfies the following conditional expression (4), and at least one negative lens:

$$20 < f_t/f_w < 60 \quad (1),$$

$$0.45 < TL_t/f_t < 0.70 \quad (3),$$

$$90 < \nu d \quad (4), \text{ and}$$

$$S_{1P} \geq S_{1N} \geq S_{2P} > S_{3P} \quad (A),$$

where $f_t$ is the focal length of the entire zoom lens system at the telephoto end, $f_w$ is the focal length of the entire zoom lens system at the wide angle end, $TL_t=TZL_t+FB_t$, where $TZL_t$ is the distance on the optical axis from the object side surface to the image side surface of the zoom lens at the telephoto end, and $FB_t$ is the back focus of the zoom lens at the telephoto end expressed in the equivalent air distance, vd is the Abbe constant with respect to the d-line of the positive lens in the first positive lens unit, $S_{1P}$ is the total number of lenses included in the first positive lens unit, $S_{1N}$ is the total number of lenses included in the first negative lens unit, $S_{2P}$ is the total number of lenses included in the second positive lens unit, and $S_{3P}$ is the total number of lenses included in the third positive lens unit.

The technical meaning of the configuration of the zoom lens according to this embodiment and the conditional expressions satisfied in the zoom lens according to this embodiment have already been described in the description of the image pickup apparatus according to the above-described embodiment. The zoom lens according to this embodiment may further be characterized by the preferred features that have been described in connection with the above-described image pickup apparatus.

An image pickup apparatus according to an embodiment includes a zoom lens and an image pickup element that is arranged on the image side of the zoom lens and has an image pickup surface to convert an image formed by the zoom lens into an electric signal. It is preferred that the zoom lens be the zoom lens according to any one of the above-described embodiments.

Thus, there can be provided an image pickup apparatus that is small in size and easy to use in various shooting situations while having a high zoom ratio or an image pickup apparatus that is small in size and has an advantageous design in performance wise.

In cases where the zoom lens has a lens unit used for focusing, the above-described features and conditions should be interpreted as those in the state in which the zoom lens is focused at infinity. Two or more of the individual features described in the foregoing may be adopted, where feasible. The conditional expressions may be applied individually.

In the above-described zoom lens, the distances between the lens units vary during zooming. In the above-described zoom lens, the lens units moves during zooming. In the above-described zoom lens, during zooming from the wide angle end to the telephoto lens, the first positive lens unit moves (only) toward the object side, the second positive lens unit moves (only) toward the object side, and the third positive lens unit moves (only) toward the image side. Furthermore, in the above-described zoom lens, the movement of the first negative zoom lens unit and the second negative lens unit includes at least partly a movement in which they move once toward the image side and thereafter toward the object side.

It is more preferred that the upper and/or lower limit values in the conditional expressions presented in the foregoing be further limited as follows in order that the advantages can be enjoyed more surely.

In condition (1), it is more preferred that the lower limit value be 24, still more preferably 27, and the upper limit value be 55, still more preferably 50.

In condition (2), it is more preferred that the lower limit value be 34°, still more preferably 36°, and the upper limit value be 48°, still more preferably 45°.

In condition (3), it is more preferred that the lower limit value be 0.48, still more preferably 0.5, and the upper limit value be 0.65, still more preferably 0.6.

In conditional expression (4), it is preferred that the lower limit value be 92, still more preferably 94. If an upper limit is to be set additionally for conditional expression (4), it is preferred that the upper limit value be 98. Not exceeding this upper limit will be cost-effective.

In condition (5), it is more preferred that the lower limit value be 0.285, and the upper limit value be 0.48.

In conditional expression (6), it is preferred that the lower limit value be 98. If an upper limit is to be set additionally for conditional expression (6), it is preferred that the upper limit value be 98. Not exceeding this upper limit will be cost-effective.

In condition (7), it is more preferred that the lower limit value be 0.2, still more preferably 0.22, and the upper limit value be 0.4, still more preferably 0.32.

In condition (8), it is more preferred that the lower limit value be −0.05, still more preferably −0.045, and the upper limit value be −0.025.

In condition (9), it is more preferred that the lower limit value be 0.06, and the upper limit value be 0.085, still more preferably 0.078.

In condition (10), it is more preferred that the lower limit value be −0.16, and the upper limit value be −0.105.

In condition (11), it is more preferred that the lower limit value be 0.1, and the upper limit value be 0.135.

In conditional expression (12), it is preferred that the lower limit value be 0.14, still more preferably 0.15. If an upper limit is to be set additionally for conditional expression (12), it is preferred that the upper limit value be 0.3. Not exceeding this upper limit leads to size reduction of the first positive lens unit, helping to reduce the overall size of the zoom lens. It is more preferred that the upper limit value be 0.2.

In conditional expression (13), it is preferred that the lower limit value be 1.5, still more preferably 1.8. If an upper limit is to be set additionally for conditional expression (13), it is preferred that the upper limit value be 2.5. Not exceeding this upper limit leads to size reduction of the first positive lens unit, helping to reduce the overall size of the zoom lens.

In conditional expression (14), it is preferred that the lower limit value be 0.5, more preferably 0.55. If an upper limit is to be set additionally for conditional expression (14), it is preferred that the upper limit value be 0.9. Not exceeding this upper limit value helps to make the refractive power of the first positive lens unit high, facilitating reduction of the size of the optical system. It is more preferred that the upper limit value be 0.7.

In conditional expression (15), it is preferred that the lower limit value be 2.2, still more preferably 2.4. If an upper limit is to be set additionally for conditional expression (15), it is preferred that the upper limit value be 3.5. Not exceeding this upper limit value enables to prevent the negative refractive power of the first negative lens unit from being necessitated to be unduly high. This is advantageous for aberration correction. It is more preferred that the upper limit value be 3.0.

In condition (16), it is more preferred that the lower limit value be 0.6, and the upper limit value be 1.7.

In the above-described image pickup apparatus and zoom lens, two or more of the above-described features may be adopted. This is advantageous for achieving better image pickup apparatus. The preferred features may be adopted in any possible combination. In the further limitation of the numerical range of the conditional expressions mentioned above, the further limitation may be made only to one of the upper limit value and the lower limit value.

In the following, examples of the zoom lens used in the image pickup apparatus according to the present invention will be described in detail with reference to the drawings. It should be understood that the present invention is by no means limited by the examples.

In the following first to eighth examples of the zoom lens will be described. FIGS. 1A and 1B to 8A to 8B are cross sectional views of the zoom lens according to the first to eighth examples respectively. FIGS. 1A, 2A, 3A, 4A, 5A, 6A, 7A, and 8A are cross sectional views of the zoom lenses at the wide angle end. FIGS. 1B, 2B, 3B, 4B, 5B, 6B, 7B, and 8B are cross sectional views of the zoom lenses at the telephoto end. All of FIGS. 1A and 1B to 8A to 8B are cross sectional views of the zoom lenses in the state in which they are focused on an object point at infinity.

In the cross sectional views, a first lens unit is denoted by G1, a second lens unit is denoted by G2, an aperture stop is denoted by S, a third lens unit is denoted by G3, a fourth lens unit is denoted by G4, a fifth lens unit is denoted by G5, a plane parallel plate constituting a cover glass of an electronic image pickup element is denoted by C, and the image plane is denoted by I. Multi-layer coating for wavelength range restriction may be applied on the surface of the cover glass C. The cover glass C may be adapted to have a low-pass filtering function.

In the following description, the first lens unit G1 has a positive refractive power and corresponds to the first positive lens unit. The second lens unit G2 has a negative refractive power and corresponds to the first negative lens unit. The third lens unit G3 has a positive refractive power and corresponds to the second positive lens unit. The fourth lens unit G4 has a negative refractive power and corresponds to the second negative lens unit. The fifth lens unit G5 has a positive refractive power and corresponds to the third positive lens unit. The image side lens unit group is composed of the third lens unit G3, the fourth lens unit G4, and the fifth lens unit G5.

The image pickup element is arranged at the position of the image plane I. In cases where the image pickup area on the image pickup element has a substantially rectangular shape, it is preferred that the image pickup element be arranged in such a way that the shorter sides of the image pickup area are oriented substantially parallel to the incidence optical axis of the zoom lens. Such arrangement is advantageous for reduction in the size of the zoom lens with respect to the direction of the incidence optical axis, leading to slimming of the image pickup apparatus.

In the zoom lenses according to the first to eighth examples, the image height at an intermediate focal length and the image height at the telephoto end are equal to each other, and the image height at the wide angle end is smaller than them. This is because the image formed at the wide angle end has a barrel-like shape, and the image having the barrel-like shape is converted into an image having a rectangular shape by electrical processing to correct distortion.

As shown in FIGS. 1A and 1B, the zoom lens according to the first example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side.

The second lens unit G2 is composed of a biconcave negative lens L5, a biconcave negative lens L6, and a biconvex positive lens L7.

The third lens unit G3 is composed of a biconvex positive lens L8, a negative meniscus lens L9 having a convex surface directed toward the object side, and a biconvex positive lens L10. The negative meniscus lens L9 and the biconvex positive lens L10 are cemented together.

The fourth lens unit G4 is composed of a negative meniscus lens L11 having a convex surface directed toward the object side.

The fifth lens unit G5 is composed of a biconvex positive lens L12.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the image side and thereafter toward the object side.

The second lens unit G2 is located closer to the object side at the telephoto end than at the wide angle end. The fourth lens unit G4 is located closer to the object side at the telephoto end than at the wide angle end.

There are eight aspheric surfaces, which include both surfaces of the biconcave negative lens L5, both surfaces of the biconvex positive lens L8, the image side surface of the biconvex positive lens L10, the image side surface of the negative meniscus lens L11, and both surfaces of the biconvex positive lens L12.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

During focusing to an object at a distance (second close distance) shorter than the aforementioned close distance (first close distance), the first lens unit G1 moves along the optical axis toward the object side, while the second lens unit G2, the third lens unit G3, the fourth lens unit G4, and the fifth lens unit G5 are stationary. The zoom lens according to the first example enables super-macro shooting by advancing (or moving) the first lens unit G1 toward the object side.

Figure 2B:
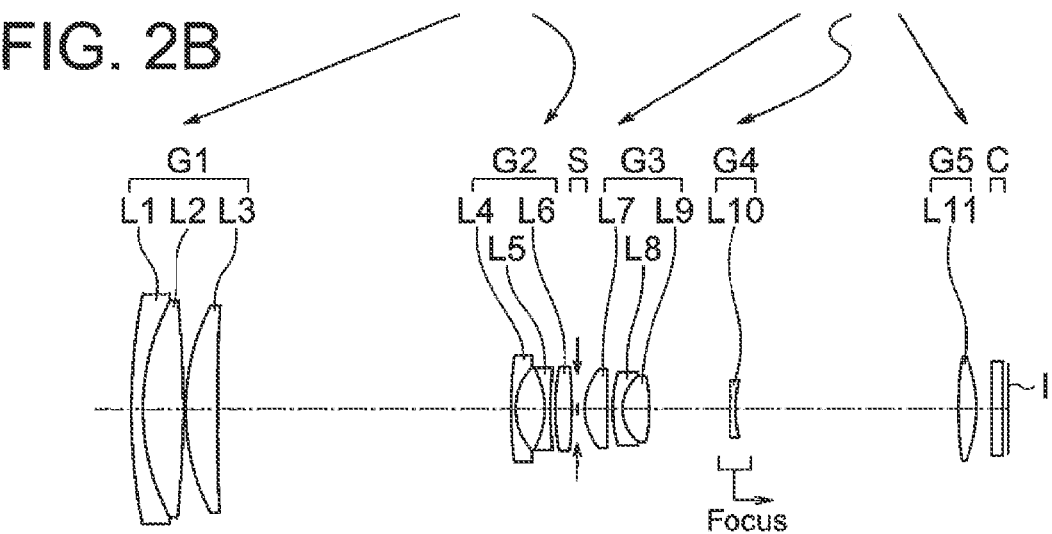

As shown in FIGS. 2A and 2B, the zoom lens according to the second example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, and a positive meniscus lens L3 having a convex surface directed toward the object side.

The second lens unit G2 is composed of a positive meniscus lens L4 having a convex surface directed toward the object side, a biconcave negative lens L5, and a biconvex positive lens L6.

The third lens unit G3 is composed of a biconvex positive lens L7, a negative meniscus lens L8 having a convex surface directed toward the object side, and a biconvex positive lens L9. The negative meniscus lens L8 and the biconvex positive lens L9 are cemented together.

The fourth lens unit G4 is composed of a biconcave negative lens L10.

The fifth lens unit G5 is composed of a biconvex positive lens L11.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the image side, thereafter toward the object side, and thereafter toward the object side. In this way, the fourth lens unit reverses its direction of movement twice.

The second lens unit G2 is located closer to the image side at the telephoto end than at the wide angle end. The fourth lens unit G4 is located closer to the object side at the telephoto end than at the wide angle end.

There are six aspheric surfaces, which include both surfaces of the biconcave negative lens L5, both surfaces of the biconvex positive lens L7, and both surfaces of the biconvex positive lens L11.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

Figure 3A:
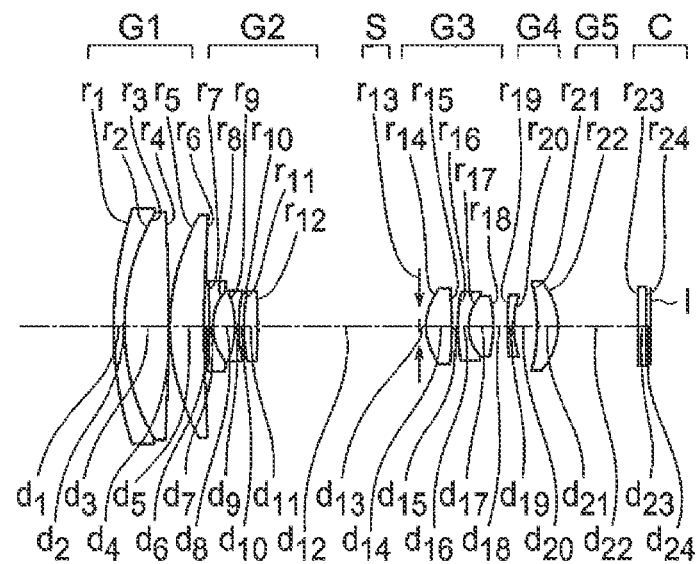
FIGS. 3A and 3B are cross sectional view of a zoom lens according to a third example of the present invention in the state in which the zoom lens is focused on an object point at infinity respectively at the wide angle end and the telephoto end.
Figure 3B:
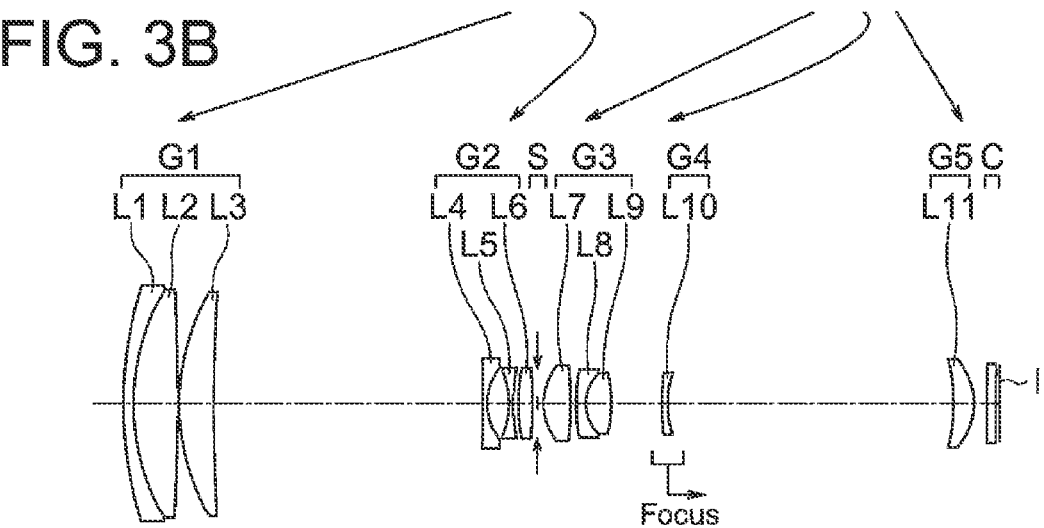

As shown in FIGS. 3A and 3B, the zoom lens according to the third example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, and a positive meniscus lens L3 having a convex surface directed toward the object side.

The second lens unit G2 is composed of a biconcave negative lens L4, a biconcave negative lens L5, and a biconvex positive lens L6.

The third lens unit G3 is composed of a biconvex positive lens L7, a negative meniscus lens L8 having a convex surface directed toward the object side, and a biconvex positive lens L9. The negative meniscus lens L8 and the biconvex positive lens L9 are cemented together.

The fourth lens unit G4 is composed of a negative meniscus lens L10 having a convex surface directed toward the object side.

The fifth lens unit G5 is composed of a positive meniscus lens L11 having a convex surface directed toward the image side.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the image side and thereafter toward the object side.

The second lens unit G2 is located closer to the object side at the telephoto end than at the wide angle end. The fourth lens unit G4 is located closer to the object side at the telephoto end than at the wide angle end.

There are six aspheric surfaces, which include both surfaces of the biconcave negative lens L5, both surfaces of the biconvex positive lens L7, and both surfaces of the positive meniscus lens L11.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

Figure 4A:
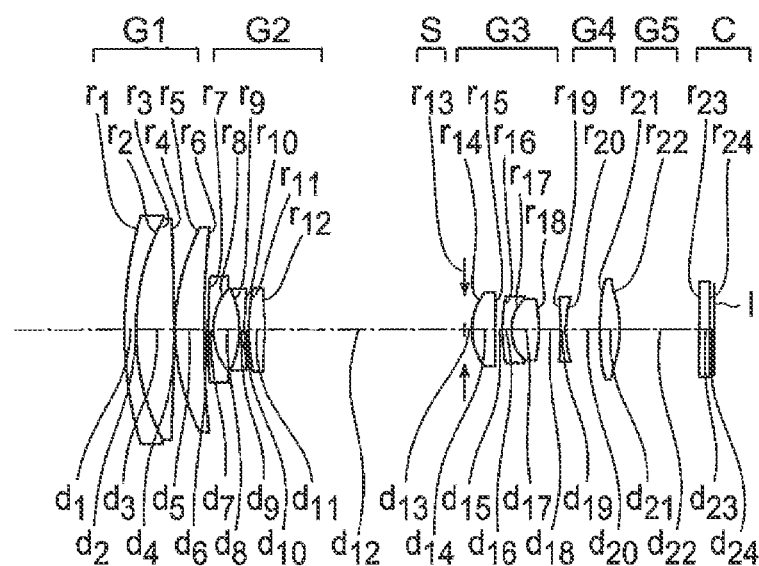
FIGS. 4A and 4B are cross sectional view of a zoom lens according to a fourth example of the present invention in the state in which the zoom lens is focused on an object point at infinity respectively at the wide angle end and the telephoto end.
Figure 4B:
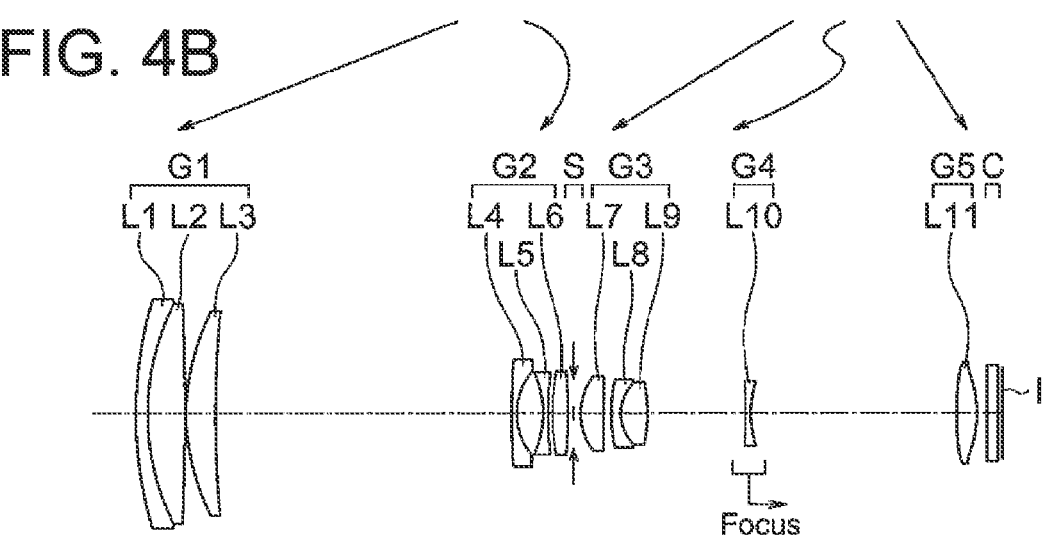

As shown in FIGS. 4A and 4B, the zoom lens according to the fourth example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, and a positive meniscus lens L3 having a convex surface directed toward the object side.

The second lens unit G2 is composed of a negative meniscus lens L4 having a convex surface directed toward the object side, a biconcave negative lens L5, and a biconvex positive lens L6.

The third lens unit G3 is composed of a positive meniscus lens L7 having a convex surface directed toward the object side, a negative meniscus lens L8 having a convex surface directed toward the object side, and a biconvex positive lens L9. The negative meniscus lens L8 and the biconvex positive lens L9 are cemented together.

The fourth lens unit G4 is composed of a biconcave negative lens L10.

The fifth lens unit G5 is composed of a biconvex positive lens L11.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the object side, thereafter toward the image side, and thereafter toward the object side. In this way, the fourth lens unit reverses its direction of movement twice.

The second lens unit G2 is located closer to the image side at the telephoto end than at the wide angle end. The fourth lens unit G4 is located closer to the object side at the telephoto end than at the wide angle end.

There are six aspheric surfaces, which include both surfaces of the biconcave negative lens L5, both surfaces of the biconvex positive lens L7, and both surfaces of the positive meniscus lens L11.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

Figure 5A:
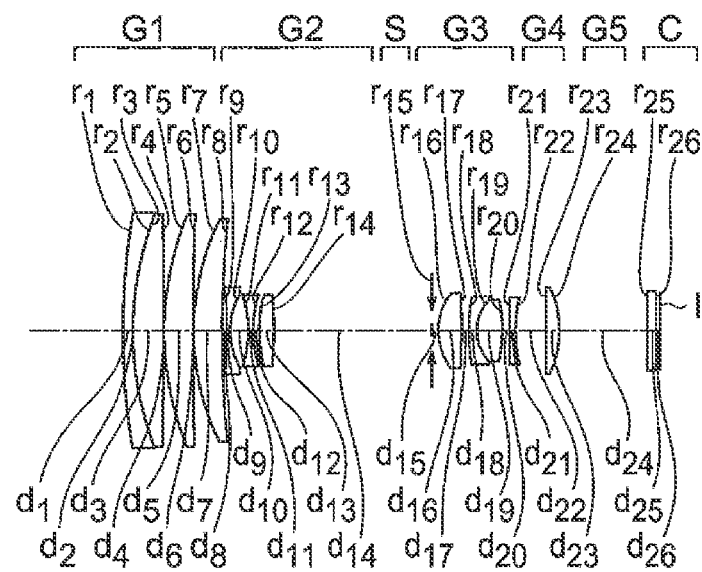
FIGS. 5A and 5B are cross sectional view of a zoom lens according to a fifth example of the present invention in the state in which the zoom lens is focused on an object point at infinity respectively at the wide angle end and the telephoto end.
Figure 5B:
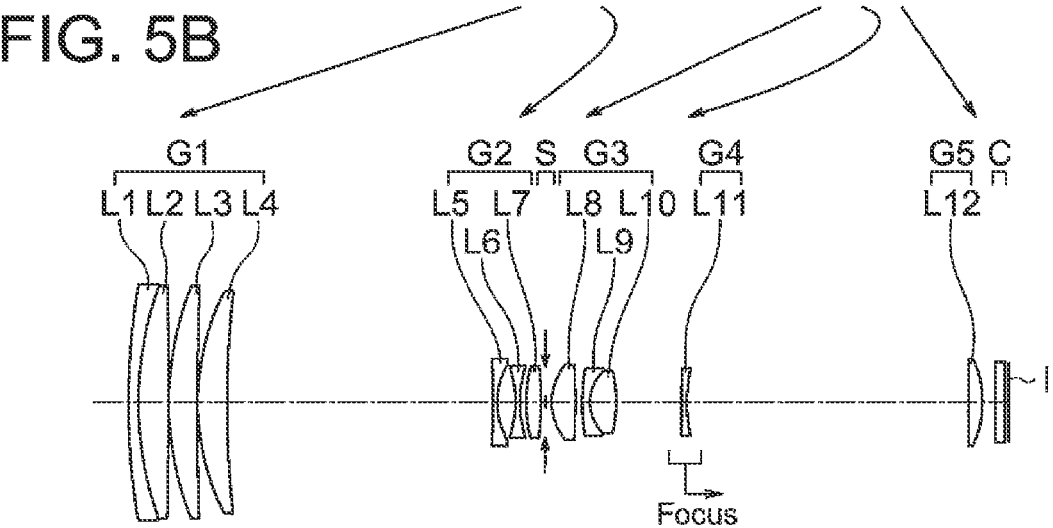

As shown in FIGS. 5A and 5B, the zoom lens according to the fifth example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side.

The second lens unit G2 is composed of a biconcave negative lens L5, a biconcave negative lens L6, and a biconvex positive lens L7.

The third lens unit G3 is composed of a biconvex positive lens L8, a negative meniscus lens L9 having a convex surface directed toward the object side, and a biconvex positive lens L10. The negative meniscus lens L9 and the biconvex positive lens L10 are cemented together.

The fourth lens unit G4 is composed of a biconcave negative lens L11.

The fifth lens unit G5 is composed of a biconvex positive lens L12.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the image side and thereafter toward the object side.

The second lens unit G2 is located closer to the object side at the telephoto end than at the wide angle end. The fourth lens unit G4 is located closer to the object side at the telephoto end than at the wide angle end.

There are five aspheric surfaces, which include both surfaces of the biconcave negative lens L6, both surfaces of the biconvex positive lens L8, and the object side surface of the biconvex positive lens L12.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

Figure 6A:
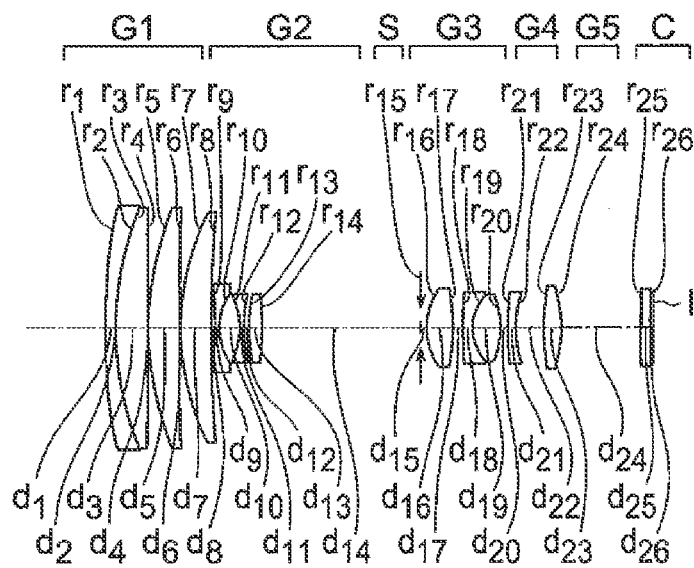
FIGS. 6A and 6B are cross sectional view of a zoom lens according to a sixth example of the present invention in the state in which the zoom lens is focused on an object point at infinity respectively at the wide angle end and the telephoto end.
Figure 6B:
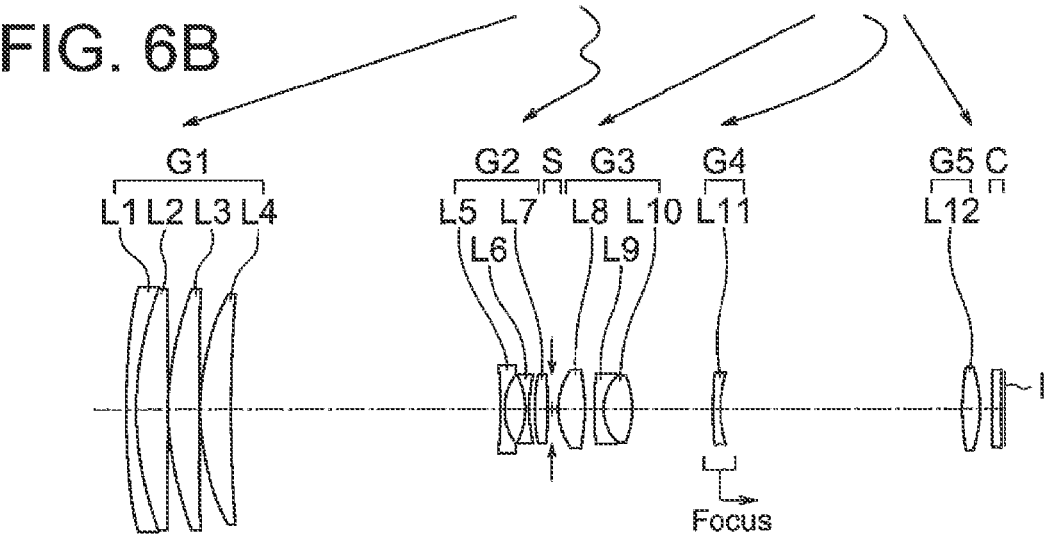

As shown in FIGS. 6A and 6B, the zoom lens according to the six example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side.

The second lens unit G2 is composed of a biconcave negative lens L5, a biconcave negative lens L6, and a biconvex positive lens L7.

The third lens unit G3 is composed of a biconvex positive lens L8, a negative meniscus lens L9 having a convex surface directed toward the object side, and a biconvex positive lens L10. The negative meniscus lens L9 and the biconvex positive lens L10 are cemented together.

The fourth lens unit G4 is composed of a negative meniscus lens L11 having a convex surface directed toward the object side.

The fifth lens unit G5 is composed of a biconvex positive lens L12.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side, thereafter toward the object side, thereafter toward the image side, and thereafter toward the object side. In this way, the second lens unit reverses its direction of movement three times. The fourth lens unit G4 moves first toward the image side and thereafter toward the object side.

The second lens unit G2 is located closer to the object side at the telephoto end than at the wide angle end. The fourth lens unit G4 is located closer to the object side at the telephoto end than at the wide angle end.

There are eight aspheric surfaces, which include both surfaces of the biconcave negative lens L5, both surfaces of the biconvex positive lens L8, the image side surface of the biconvex positive lens L10, the image side surface of the negative meniscus lens L11, and both surfaces of the biconvex positive lens L12.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

Figure 7A:
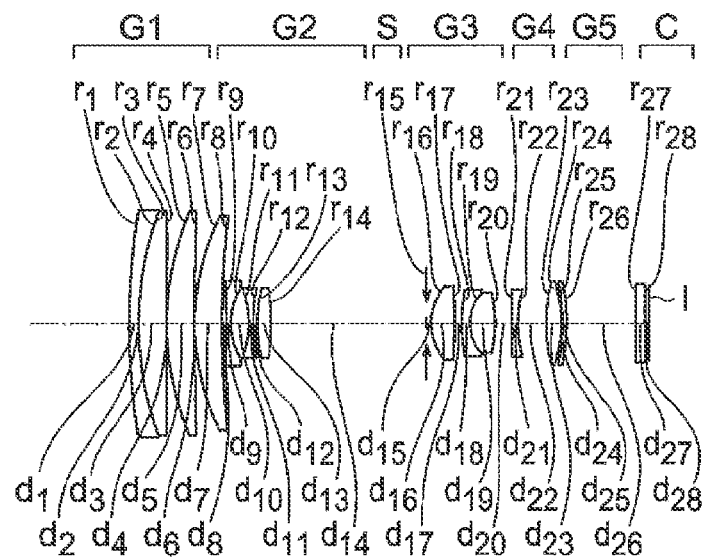
FIGS. 7A and 7B are cross sectional view of a zoom lens according to a seventh example of the present invention in the state in which the zoom lens is focused on an object point at infinity respectively at the wide angle end and the telephoto end.
Figure 7B:
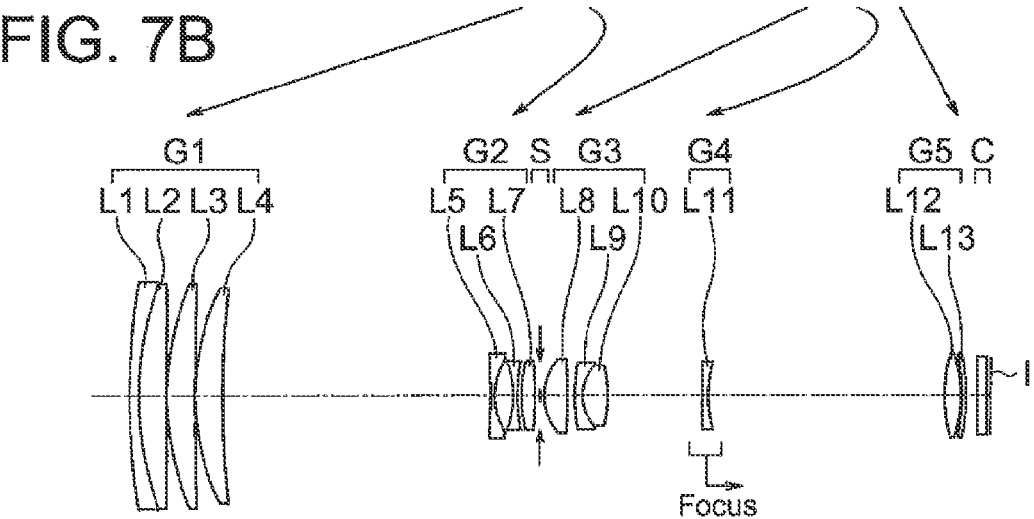

As shown in FIGS. 7A and 7B, the zoom lens according to the seventh example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side.

The second lens unit G2 is composed of a biconcave negative lens L5, a biconcave negative lens L6, and a biconvex positive lens L7.

The third lens unit G3 is composed of a biconvex positive lens L8, a negative meniscus lens L9 having a convex surface directed toward the object side, and a biconvex positive lens L10. The negative meniscus lens L9 and the biconvex positive lens L10 are cemented together.

The fourth lens unit G4 is composed of a negative meniscus lens L11 having a convex surface directed toward the object side.

The fifth lens unit G5 is composed of a biconvex positive lens L12 and a negative meniscus lens L13 having a convex surface directed toward the image side.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the image side and thereafter toward the object side.

The second lens unit G2 is located closer to the object side at the telephoto end than at the wide angle end. The fourth lens unit G4 is located closer to the object side at the telephoto end than at the wide angle end.

There are eight aspheric surfaces, which include both surfaces of the biconcave negative lens L5, both surfaces of the biconvex positive lens L8, the image side surface of the biconvex positive lens L10, the image side surface of the negative meniscus lens L11, and both surfaces of the biconvex positive lens L12.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

Figure 8A:
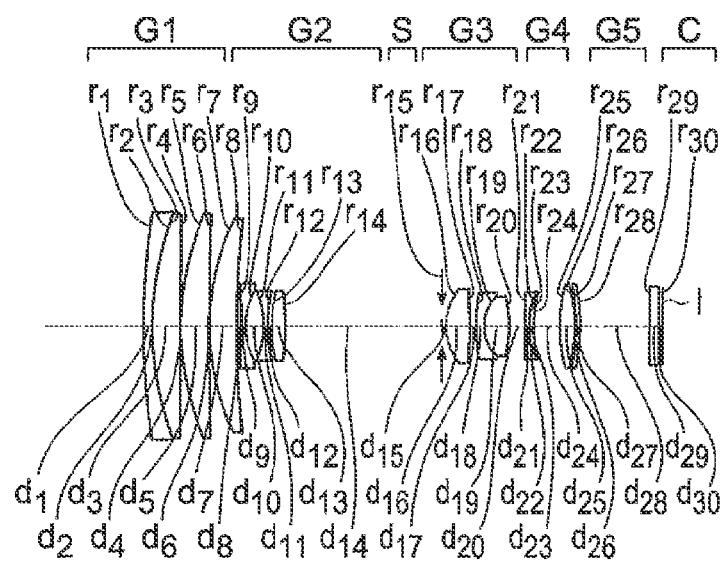
FIGS. 8A and 8B are cross sectional view of a zoom lens according to a eighth example of the present invention in the state in which the zoom lens is focused on an object point at infinity respectively at the wide angle end and the telephoto end.
Figure 8B:
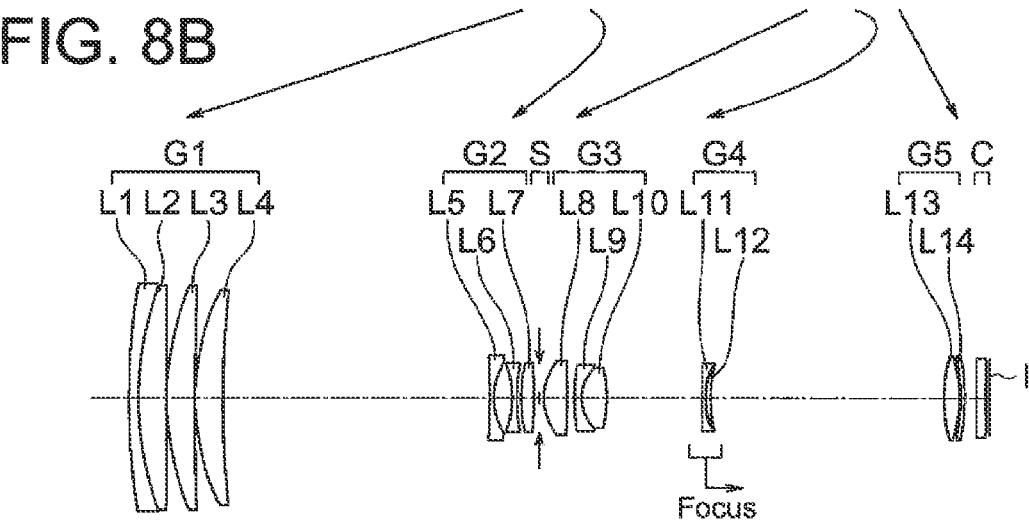

As shown in FIGS. 8A and 8B, the zoom lens according to the eighth example includes, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is arranged between the second lens unit G2 and the third lens unit G3.

The first lens unit G1 is composed of a negative meniscus lens L1 having a convex surface directed toward the object side, a biconvex positive lens L2, a positive meniscus lens L3 having a convex surface directed toward the object side, and a positive meniscus lens L4 having a convex surface directed toward the object side.

The second lens unit G2 is composed of a biconcave negative lens L5, a biconcave negative lens L6, and a biconvex positive lens L7.

The third lens unit G3 is composed of a biconvex positive lens L8, a negative meniscus lens L9 having a convex surface directed toward the object side, and a biconvex positive lens L10. The negative meniscus lens L9 and the biconvex positive lens L10 are cemented together.

The fourth lens unit G4 is composed of a plano-concave negative lens L11 and a positive meniscus lens L12 having a convex surface directed toward the object side.

The fifth lens unit G5 is composed of a biconvex positive lens L13 and a negative meniscus lens L14 having a convex surface directed toward the image side.

During zooming from the wide angle end to the telephoto end, the first lens unit G1 moves only toward the object side, the second lens unit G2 moves, the aperture stop S moves with the third lens unit G3, the third lens unit G3 moves only toward the object side, the fourth lens unit G4 moves, and the fifth lens unit G5 moves only toward the image side. Specifically, the second lens unit G2 moves first toward the image side and thereafter toward the object side, and the fourth lens unit G4 moves first toward the image side and thereafter toward the object side.

The second lens unit G2 is located closer to the object side at the telephoto end than at the wide angle end. The fourth lens unit G4 is located closer to the object side at the telephoto end than at the wide angle end.

There are eight aspheric surfaces, which include both surfaces of the biconcave negative lens L5, both surfaces of the biconvex positive lens L8, the image side surface of the biconvex positive lens L10, the image side surface of the positive meniscus lens L12, and both surfaces of the biconvex positive lens L13.

During focusing from an object at infinity to an object at an extremely close distance (first extremely close distance), the fourth lens unit G4 moves along the optical axis toward the image side, while the first lens unit G1, the second lens unit G2, the third lens unit G3, and the fifth lens unit G5 are stationary.

In the following, numerical data of the zoom lenses according to the examples will be presented. In the numerical data of the examples, the radius of curvature r of each lens surface, the distance d between adjacent lenses, the refractive index nd with respect to the d-line of each lens, and the Abbe constant ν of each lens are presented. The lens surfaces having a surface number with an asterisk "*" are aspheric surfaces. In the zoom data, f represents the focal length of the entire zoom lens system, FNO. represents the F-number, ω represents the half angle of view, IH represents the image height, and FB represents the back focus. In the following data, "overall length" is the sum of the distance from the lens surface closest to the object side to the lens surface closest to the image side in the zoom lens and the back focus FB. The focal lengths f1, f2, . . . of the respective lens units will also be presented. The back focus FB is the distance from the last lens surface to the paraxial image plane, expressed in the equivalent air distance.

Zoom data is given for the wide angle end (wide angle), a first intermediate focal length state (intermediate 1), a second intermediate focal length state (intermediate 2), a third intermediate focal length state (intermediate 3), and the telephoto end (telephoto). The first intermediate focal length state is a focal length state between the wide angle end and the second intermediate focal length state, and the third intermediate focal length state is a focal length state between the second focal length state and the telephoto end. During actual zooming from the wide angle end to the telephoto end, the focal length varies in order of the wide angle end, the first intermediate focal length state, the second intermediate focal length state, the third intermediate focal length state, and the telephoto end.

In the numerical data of the first example, various data is presented also for the state in which the zoom lens is focused on an object at the second extremely close distance (in the super-macro state), where Pos1 is numerical data for the first macro shooting, and Pos 2 is numerical data for the second macro shooting. In this connection, the "extremely close distance" refers to the distance from the lens surface closest to the object side to the object.

Numerical data of each embodiment described above is shown below. Apart from symbols described above, f denotes a focal length of the entire zoom lens system, $F_{NO}$ denotes an F number, ω denotes a half angle of field, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of νd1, νd2, . . . denotes an Abbe constant for each lens. Further, * denotes an aspheric data, ER denotes an effective radius.

The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(k+1)(y/r)^2\}^{1/2}]+A4y^4+A6y^6+A8y^8+A10y^{10}+A12y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Example 1

| Unit mm | | | |
|---|---|---|---|
| Surface data | | | |
| Surface no. | r | d | nd | vd |
| Object plane | ∞ | ∞ | | |
| 1 | 76.873 | 1.00 | 1.91082 | 35.25 |
| 2 | 36.739 | 0.15 | | |
| 3 | 38.956 | 2.99 | 1.49700 | 81.54 |

-continued

| Unit mm | | | | |
|---|---|---|---|---|
| 4 | −2000.000 | 0.10 | | |
| 5 | 34.300 | 3.03 | 1.43875 | 94.93 |
| 6 | 330.559 | 0.10 | | |
| 7 | 28.995 | 3.02 | 1.43875 | 94.93 |
| 8 | 141.577 | Variable | | |
| 9* | −24.654 | 0.40 | 1.86400 | 40.58 |
| 10* | 8.060 | 2.10 | | |
| 11 | −9.985 | 0.45 | 1.72916 | 54.68 |
| 12 | 18.498 | 0.53 | | |
| 13 | 20.394 | 1.45 | 1.94595 | 17.98 |
| 14 | −39.429 | Variable | | |
| 15(stop) | ∞ | 0.66 | | |
| 16* | 6.685 | 2.61 | 1.58313 | 59.46 |
| 17* | −29.666 | 0.97 | | |
| 18 | 34.318 | 0.84 | 1.91082 | 35.25 |
| 19 | 5.081 | 2.86 | 1.48749 | 70.23 |
| 20* | −13.096 | Variable | | |
| 21 | 93.325 | 0.61 | 1.49700 | 81.54 |
| 22* | 11.774 | Variable | | |
| 23* | 28.818 | 1.56 | 1.49710 | 81.56 |
| 24* | −14.158 | Variable | | |
| 25 | ∞ | 1.00 | 1.51633 | 64.14 |
| 26 | ∞ | 0.40 | | |
| Image plane (Image pickup surface) | ∞ | | | |

Aspherical surface data

9th surface k = 0.000
A4 = 5.74403e−04, A6 = −4.41207e−06, A8 = −2.04129e−07,
A10 = 5.25599e−09

10th surface k = 0.000
A4 = 4.10529e−04, A6 = 1.10341e−05, A8 = −5.97778e−07,
A10 = 2.66856e−08

16th surface k = 0.000
A4 = −3.21650e−04, A6 = −1.38221e−06, A8 = −9.01321e−08,
A10 = 1.12360e−09

17th surface k = 0.000
A4 = 2.55310e−04, A6 = −1.09852e−06, A8 = 2.89590e−08,
A10 = 1.84211e−09

20th surface k = 0.000
A4 = −6.64184e−05, A6 = −4.11923e−06, A8 = 7.14519e−08,
A10 = −1.70739e−08

22th surface k = 0.000
A4 = −3.35472e−05, A6 = 8.42006e−06, A8 = −7.30402e−07,
A10 = 4.38207e−08

23th surface k = 0.000
A4 = −1.15495e−04, A6 = 3.93790e−05, A8 = −5.08278e−07,
A10 = 2.28220e−08

24th surface k = 0.000
A4 = 1.24798e−04, A6 = 3.84628e−05

Zoom data

| | Wide angle | Intermediate2 | Telephoto |
|---|---|---|---|
| Focal length | 4.55 | 28.21 | 174.87 |
| Fno. | 3.88 | 5.00 | 6.83 |
| IH | 3.39 | 3.86 | 3.86 |
| 2ω | 82.1 | 15.0 | 2.5 |
| fb(in air) | 8.53 | 4.37 | 2.46 |

-continued

| Unit mm | | | |
|---|---|---|---|
| Lens total length(in air) | 56.44 | 75.62 | 94.73 |
| d8 | 0.49 | 20.01 | 29.32 |
| d14 | 16.94 | 6.33 | 0.50 |
| d20 | 2.57 | 15.71 | 9.43 |
| d22 | 2.48 | 3.76 | 27.59 |
| d24 | 7.47 | 3.31 | 1.40 |

| | Intermediate1 | Intermediate3 |
|---|---|---|
| Focal length | 11.33 | 70.23 |
| Fno. | 4.40 | 6.10 |
| IH | 3.86 | 3.86 |
| 2ω | 36.6 | 6.1 |
| fb(in air) | 6.53 | 2.77 |
| Lens total length(in air) | 61.95 | 82.53 |
| d8 | 7.43 | 26.93 |
| d14 | 8.61 | 3.96 |
| d20 | 12.35 | 13.66 |
| d22 | 1.60 | 9.77 |
| d24 | 5.47 | 1.71 |

Unit focal length f1 = 42.69   f2 = −5.51   f3 = 11.48   f4 = −27.18   f5 = 19.33

Space data at super macro

| | Pos1 | Pos2 |
|---|---|---|
| Extremely close distance | 192.558 | 295.137 |
| Magnification | 0.136 | 0.1963 |
| Focal length | 47.49 | 117.51 |
| Fno. | 4.27 | 4.60 |
| 2ω | 7.97 | 2.95 |
| fb(in air) | 4.37 | 2.83 |
| Lens total length(in air) | 83.06 | 87.26 |
| d8 | 27.46 | 31.61 |
| d14 | 6.33 | 3.96 |
| d20 | 18.96 | 21.01 |
| d22 | 0.51 | 2.43 |
| d24 | 3.24 | 1.64 |
| d27 | 0.08 | 0.13 |

Example 2

| Unit mm | | | | |
|---|---|---|---|---|
| Surface data | | | | |
| Surface no. | r | d | nd | νd |
| Object plane | ∞ | ∞ | | |
| 1 | 54.790 | 1.00 | 1.88300 | 40.76 |
| 2 | 21.924 | 0.10 | | |
| 3 | 22.233 | 3.55 | 1.43875 | 94.93 |
| 4 | −104.089 | 0.15 | | |
| 5 | 20.468 | 2.93 | 1.59282 | 68.63 |
| 6 | 194.731 | Variable | | |
| 7 | 40.248 | 0.40 | 1.88300 | 40.76 |
| 8 | 5.841 | 2.63 | | |
| 9* | −7.633 | 0.45 | 1.74156 | 49.21 |
| 10* | 29.063 | 0.45 | | |
| 11 | 22.920 | 1.46 | 1.94595 | 17.98 |
| 12 | −30.990 | Variable | | |
| 13(stop) | ∞ | 0.66 | | |
| 14* | 5.675 | 1.99 | 1.58313 | 59.46 |
| 15* | −366.065 | 0.50 | | |
| 16 | 14.038 | 0.82 | 1.91082 | 35.25 |
| 17 | 4.048 | 2.40 | 1.48749 | 70.23 |
| 18 | −13.571 | Variable | | |
| 19 | −35.830 | 0.43 | 1.51633 | 64.14 |
| 20 | 9.415 | Variable | | |
| 21* | 25.415 | 1.69 | 1.49710 | 81.56 |

-continued

Unit mm

| | | | | |
|---|---|---|---|---|
| 22* | −12.042 | Variable | | |
| 23 | ∞ | 1.00 | 1.51633 | 64.14 |
| 24 | ∞ | 0.40 | | |
| Image plane (Image pickup surface) | ∞ | | | |

Aspherical surface data

9th surface k = 0.000
A4 = 4.22776e−04, A6 = −5.36808e−05, A8 = 4.37478e−06,
A10 = −1.06838e−07
10th surface k = 0.000
A4 = 3.22877e−04, A6 = −5.49769e−05, A8 = 4.74077e−06,
A10 = −1.21176e−07
14th surface k = 0.000
A4 = −1.41008e−04, A6 = −1.53643e−05, A8 = 2.73442e−07,
A10 = 3.23009e−09
15th surface k = 0.000
A4 = 5.45234e−04, A6 = −1.85978e−05, A8 = 6.46690e−07,
A10 = 3.43566e−09
21th surface k = 0.000
A4 = −3.24708e−04, A6 = 8.45115e−06, A8 = −1.60315e−07,
A10 = 5.05996e−09
22th surface k = 0.000
A4 = −1.62401e−04, A6 = 7.96280e−06, A8 = −1.93649e−07,
A10 = 5.85825e−09

Zoom data

| | Wide angle | Intermediate2 | Telephoto |
|---|---|---|---|
| Focal length | 4.55 | 24.41 | 130.99 |
| Fno. | 3.08 | 5.15 | 6.91 |
| IH | 3.53 | 4.16 | 4.16 |
| 2ω | 83.1 | 18.5 | 3.6 |
| fb(in air) | 8.46 | 5.75 | 2.46 |
| Lens total length(in air) | 53.23 | 63.83 | 78.08 |
| d6 | 0.34 | 15.18 | 26.33 |
| d12 | 17.28 | 4.89 | 0.50 |
| d18 | 2.26 | 11.22 | 7.33 |
| d20 | 3.27 | 5.17 | 19.85 |
| d22 | 7.41 | 4.69 | 1.40 |

| | Intermediate1 | Intermediate3 |
|---|---|---|
| Focal length | 10.54 | 56.55 |
| Fno. | 4.05 | 6.40 |
| IH | 4.16 | 4.16 |
| 2ω | 42.5 | 8.3 |
| fb(in air) | 7.76 | 2.89 |
| Lens total length(in air) | 54.43 | 72.53 |
| d6 | 3.80 | 21.77 |
| d12 | 8.26 | 3.46 |
| d18 | 6.77 | 10.54 |
| d20 | 6.22 | 12.26 |
| d22 | 6.70 | 1.83 |

Unit focal length

| | | | | |
|---|---|---|---|---|
| f1 = 38.14 | f2 = −5.60 | f3 = 9.89 | f4 = −14.39 | f5 = 16.69 |

Example 3

Unit mm

Surface data

| Surface no. | r | d | nd | vd |
|---|---|---|---|---|
| Object plane | ∞ | ∞ | | |
| 1 | 42.672 | 1.00 | 1.91082 | 35.25 |
| 2 | 24.799 | 0.13 | | |
| 3 | 24.640 | 4.65 | 1.49700 | 81.54 |
| 4 | −251.690 | 0.15 | | |
| 5 | 24.626 | 3.60 | 1.49700 | 81.54 |
| 6 | 169.568 | Variable | | |
| 7 | −133.765 | 0.40 | 1.88300 | 40.76 |
| 8 | 6.757 | 2.27 | | |
| 9* | −8.308 | 0.45 | 1.74156 | 49.21 |
| 10* | 25.509 | 0.48 | | |
| 11 | 19.169 | 1.48 | 1.94595 | 17.98 |
| 12 | −40.121 | Variable | | |
| 13(stop) | ∞ | 0.66 | | |
| 14* | 6.549 | 2.76 | 1.58313 | 59.46 |
| 15* | −38.493 | 0.58 | | |
| 16 | 23.270 | 1.05 | 1.91082 | 35.25 |
| 17 | 4.859 | 2.68 | 1.48749 | 70.23 |
| 18 | −14.732 | Variable | | |
| 19 | 36.768 | 0.62 | 1.51633 | 64.14 |
| 20 | 10.070 | Variable | | |
| 21* | −35.811 | 2.20 | 1.49710 | 81.56 |
| 22* | −8.092 | Variable | | |
| 23 | ∞ | 1.00 | 1.51633 | 64.14 |
| 24 | ∞ | 0.40 | | |
| Image plane (Image pickup surface) | ∞ | | | |

Aspherical surface data

9th surface k = 0.000
A4 = 6.34015e−04, A6 = 2.18875e−05, A8 = −3.31401e−06,
A10 = 1.17218e−07
10th surface k = 0.000
A4 = 5.72573e−04, A6 = 6.94117e−07, A8 = −2.13581e−06,
A10 = 8.95311e−08
14th surface k = 0.000
A4 = −3.39715e−04, A6 = 5.64902e−06, A8 = −4.89183e−07,
A10 = 2.47289e−09
15th surface k = 0.000
A4 = 1.97393e−04, A6 = 9.37210e−06, A8 = −7.55161e−07,
A10 = 1.29566e−08
21th surface k = 0.000
A4 = −6.83520e−04, A6 = −3.97071e−06, A8 = 1.65522e−06,
A10 = −7.97399e−08
22th surface k = 0.000
A4 = −2.86777e−04, A6 = 4.09813e−06, A8 = 8.99804e−07,
A10 = −4.54312e−08

Zoom data

| | Wide angle | Intermediate2 | Telephoto |
|---|---|---|---|
| Focal length | 4.55 | 28.21 | 174.87 |
| Fno. | 3.88 | 5.00 | 6.88 |
| IH | 3.53 | 4.16 | 4.16 |
| 2ω | 85.0 | 16.1 | 2.8 |
| fb(in air) | 9.40 | 5.55 | 2.46 |
| Lens total length(in air) | 56.23 | 75.51 | 92.23 |

-continued

Unit mm

| | | | |
|---|---:|---:|---:|
| d6 | 0.48 | 19.34 | 28.61 |
| d12 | 17.31 | 7.16 | 0.50 |
| d18 | 1.47 | 9.32 | 5.42 |
| d20 | 2.42 | 9.00 | 30.10 |
| d22 | 8.34 | 4.49 | 1.40 |

| | Intermediate1 | Intermediate3 |
|---|---:|---:|
| Focal length | 11.33 | 70.23 |
| Fno. | 4.40 | 6.10 |
| IH | 4.16 | 4.16 |
| 2ω | 39.0 | 6.8 |
| fb(in air) | 7.68 | 1.89 |
| Lens total length(in air) | 61.37 | 81.23 |
| d6 | 6.73 | 25.38 |
| d12 | 9.02 | 4.44 |
| d18 | 8.42 | 10.37 |
| d20 | 4.38 | 14.01 |
| d22 | 6.62 | 0.83 |

Unit focal length

| | | | | |
|---|---|---|---|---|
| f1 = 41.79 | f2 = −5.55 | f3 = 11.13 | f4 = −27.07 | f5 = 20.49 |

Example 4

Unit mm

Surface data

| Surface no. | r | d | nd | νd |
|---|---:|---:|---:|---:|
| Object plane | ∞ | ∞ | | |
| 1 | 38.921 | 1.00 | 1.91082 | 35.25 |
| 2 | 22.847 | 0.10 | | |
| 3 | 22.675 | 3.36 | 1.49700 | 81.54 |
| 4 | −296.725 | 0.15 | | |
| 5 | 21.419 | 2.57 | 1.49700 | 81.54 |
| 6 | 91.753 | Variable | | |
| 7 | 82.949 | 0.40 | 1.88300 | 40.76 |
| 8 | 5.785 | 2.45 | | |
| 9* | −8.940 | 0.45 | 1.74156 | 49.21 |
| 10* | 34.684 | 0.38 | | |
| 11 | 19.397 | 1.45 | 1.94595 | 17.98 |
| 12 | −45.810 | Variable | | |
| 13(stop) | ∞ | 0.66 | | |
| 14* | 5.868 | 2.07 | 1.58313 | 59.46 |
| 15* | 412.402 | 0.67 | | |
| 16 | 14.034 | 0.83 | 1.91082 | 35.25 |
| 17 | 4.227 | 2.37 | 1.48749 | 70.23 |
| 18 | −13.284 | Variable | | |
| 19 | −47.610 | 0.44 | 1.51633 | 64.14 |
| 20 | 9.092 | Variable | | |
| 21* | 24.494 | 1.75 | 1.49710 | 81.56 |
| 22* | −11.958 | Variable | | |
| 23 | ∞ | 1.00 | 1.51633 | 64.14 |
| 24 | ∞ | 0.40 | | |
| Image plane (Image pickup surface) | ∞ | | | |

Aspherical surface data

9th surface k = 0.000
A4 = 4.49114e−05, A6 = 2.58363e−05, A8 = −1.57823e−06,
A10 = 3.43855e−08

10th surface k = 0.000
A4 = 1.99078e−05, A6 = 1.62937e−05, A8 = −1.13964e−06,
A10 = 2.86830e−08

Unit mm

14th surface k = 0.000
A4 = −2.13179e−04, A6 = −2.53479e−06, A8 = −1.57084e−07,
A10 = 5.02378e−09

15th surface k = 0.000
A4 = 4.14668e−04, A6 = −1.19363e−07, A8 = −2.29816e−07,
A10 = 1.45490e−08

21st surface k = 0.000
A4 = −5.00222e−04, A6 = 4.67885e−05, A8 = −2.38442e−06,
A10 = 7.57654e−08

22th surface k = 0.000
A4 = −3.81892e−04, A6 = 5.45636e−05, A8 = −2.86603e−06,
A10 = 8.75631e−08

Zoom data

| | Wide angle | Intermediate2 | Telephoto |
|---|---:|---:|---:|
| Focal length | 4.55 | 24.41 | 131.01 |
| Fno. | 2.81 | 4.69 | 7.04 |
| IH | 3.53 | 4.16 | 4.16 |
| 2ω | 82.8 | 18.5 | 3.6 |
| fb(in air) | 8.55 | 5.16 | 2.46 |
| Lens total length(in air) | 53.23 | 63.83 | 78.08 |
| d6 | 0.32 | 14.97 | 26.64 |
| d12 | 18.05 | 5.36 | 0.50 |
| d18 | 2.12 | 11.35 | 8.81 |
| d20 | 3.10 | 5.89 | 18.58 |
| d22 | 7.09 | 3.70 | 1.00 |
| d25 | 0.40 | 0.40 | 0.40 |

| | Intermediate1 | Intermediate3 |
|---|---:|---:|
| Focal length | 10.54 | 56.55 |
| Fno. | 3.94 | 6.09 |
| IH | 4.16 | 4.16 |
| 2ω | 42.3 | 8.3 |
| fb(in air) | 6.85 | 2.68 |
| Lens total length(in air) | 53.65 | 72.28 |
| d6 | 3.89 | 21.84 |
| d12 | 8.80 | 3.52 |
| d18 | 7.25 | 11.58 |
| d20 | 5.77 | 11.55 |
| d22 | 5.39 | 1.23 |
| d25 | 0.40 | 0.40 |

Unit focal length

| | | | | |
|---|---|---|---|---|
| f1 = 40.04 | f2 = −5.72 | f3 = 10.10 | f4 = −14.75 | f5 = 16.43 |

Example 5

Unit mm

Surface data

| Surface no. | r | d | nd | νd |
|---|---:|---:|---:|---:|
| Object plane | ∞ | ∞ | | |
| 1 | 81.806 | 1.00 | 1.91082 | 35.25 |
| 2 | 36.191 | 0.10 | | |
| 3 | 37.061 | 3.19 | 1.49700 | 81.54 |
| 4 | −498.419 | 0.10 | | |
| 5 | 35.000 | 2.91 | 1.45600 | 90.28 |
| 6 | 290.553 | 0.10 | | |
| 7 | 27.700 | 3.00 | 1.45600 | 90.28 |

-continued

| Unit mm | | |
|---|---|---|
| 8 | 114.422 | Variable |
| 9 | −71.570 | 0.40 | 1.88300 | 40.76 |
| 10 | 7.630 | 1.98 |
| 11* | −10.161 | 0.45 | 1.74156 | 49.21 |
| 12* | 11.909 | 0.69 |
| 13 | 17.463 | 1.50 | 1.94595 | 17.98 |
| 14 | −43.852 | Variable |
| 15(stop) | ∞ | 0.66 |
| 16* | 6.138 | 2.46 | 1.58313 | 59.46 |
| 17* | −96.248 | 0.77 |
| 18 | 20.534 | 0.80 | 1.91082 | 35.25 |
| 19 | 4.640 | 2.77 | 1.48749 | 70.23 |
| 20 | −14.090 | Variable |
| 21 | −105.171 | 0.62 | 1.51633 | 64.14 |
| 22 | 15.733 | Variable |
| 23* | 66.048 | 1.55 | 1.49710 | 81.56 |
| 24 | −11.578 | Variable |
| 25 | ∞ | 1.00 | 1.51633 | 64.14 |
| 26 | ∞ | 0.40 |
| Image plane (Image pickup surface) | ∞ | |

Aspherical surface data

11th surface k = 0.000
A4 = 4.85772e−04, A6 = −1.06983e−06, A8 = −4.38703e−07,
A10 = 9.23372e−09

12th surface k = 0.000
A4 = 1.96415e−04, A6 = −1.07949e−05

16th surface k = 0.000
A4 = −3.22634e−04, A6 = −2.20402e−06, A8 = −1.74689e−08,
A10 = −5.39377e−09

17th surface k = 0.000
A4 = 2.44920e−04

23th surface k = 0.000
A4 = −2.72542e−04, A6 = −1.66190e−07

Zoom data

| | Wide angle | Intermediate2 | Telephoto |
|---|---|---|---|
| Focal length | 4.55 | 28.21 | 174.88 |
| Fno. | 3.88 | 5.00 | 6.88 |
| IH | 3.53 | 4.16 | 4.16 |
| 2ω | 86.1 | 16.0 | 2.7 |
| fb(in air) | 10.11 | 5.60 | 2.45 |
| Lens total length(in air) | 56.23 | 74.23 | 92.72 |
| d8 | 0.41 | 19.39 | 28.29 |
| d14 | 16.73 | 6.27 | 0.50 |
| d20 | 0.80 | 13.40 | 6.83 |
| d22 | 3.13 | 4.51 | 29.60 |
| d24 | 9.05 | 4.54 | 1.40 |

| | Intermediate1 | Intermediate3 |
|---|---|---|
| Focal length | 11.33 | 70.23 |
| Fno. | 4.40 | 6.10 |
| IH | 4.16 | 4.16 |
| 2ω | 39.1 | 6.6 |
| fb(in air) | 7.96 | 3.11 |
| Lens total length(in air) | 61.79 | 81.23 |
| d8 | 8.17 | 25.65 |
| d14 | 8.79 | 3.98 |
| d20 | 9.67 | 11.89 |

-continued

| Unit mm | | |
|---|---|---|
| d22 | 2.15 | 11.54 |
| d24 | 6.90 | 2.05 |

Unit focal length f1 = 41.26  f2 = −5.47  f3 = 11.19  f4 = −26.46  f5 = 19.95

Example 6

| Unit mm | | | | |
|---|---|---|---|---|

Surface data

| Surface no. | r | d | nd | vd |
|---|---|---|---|---|
| Object plane | ∞ | ∞ |
| 1 | 76.944 | 1.00 | 1.91082 | 35.25 |
| 2 | 36.940 | 0.10 |
| 3 | 38.129 | 3.37 | 1.49700 | 81.54 |
| 4 | −2000.000 | 0.10 |
| 5 | 36.915 | 3.38 | 1.43875 | 94.93 |
| 6 | 525.263 | 0.10 |
| 7 | 29.122 | 3.30 | 1.43875 | 94.93 |
| 8 | 139.806 | Variable |
| 9* | −28.378 | 0.43 | 1.86400 | 40.58 |
| 10* | 8.375 | 2.11 |
| 11 | −9.529 | 0.45 | 1.72916 | 54.68 |
| 12 | 17.272 | 0.57 |
| 13 | 21.139 | 1.45 | 1.94595 | 17.98 |
| 14 | −37.154 | Variable |
| 15(stop) | ∞ | 0.66 |
| 16* | 7.260 | 2.85 | 1.58313 | 59.46 |
| 17* | −20.028 | 1.05 |
| 18 | 59.130 | 1.00 | 1.91082 | 35.25 |
| 19 | 5.387 | 3.10 | 1.48749 | 70.23 |
| 20* | −12.788 | Variable |
| 21 | 66.179 | 0.76 | 1.49700 | 81.54 |
| 22* | 11.681 | Variable |
| 23* | 25.830 | 1.94 | 1.49710 | 81.56 |
| 24* | −14.918 | Variable |
| 25 | ∞ | 1.00 | 1.51633 | 64.14 |
| 26 | ∞ | 0.40 |
| Image plane (Image pickup surface) | ∞ | |

Aspherical surface data

9th surface k = 0.000
A4 = 5.33768e−04, A6 = −4.52696e−06, A8 = −7.06370e−08,
A10 = 2.17837e−09

10th surface k = 0.000
A4 = 3.65845e−04, A6 = 9.26416e−06, A8 = −4.97531e−07,
A10 = 3.59183e−08

16th surface k = 0.000
A4 = −3.15331e−04, A6 = −2.12781e−06, A8 = −2.36001e−07,
A10 = 1.25714e−08

17th surface k = 0.000
A4 = 2.81533e−04, A6 = −8.19928e−06, A8 = 2.16359e−07,
A10 = 7.26872e−09

20th surface k = 0.000
A4 = −1.88851e−04, A6 = 4.57536e−06, A8 = −7.26281e−07,
A10 = −4.62290e−09

22th surface

-continued

Unit mm k = 0.000
A4 = −1.22024e−05, A6 = 2.53700e−06, A8 = 1.88302e−07,
A10 = −1.39628e−08
23th surface k = 0.000
A4 = −2.90471e−04, A6 = 1.30652e−05, A8 = −1.37328e−07,
A10 = 1.30885e−09
24th surface k = 0.000
A4 = −9.84317e−05, A6 = 8.99929e−06

Zoom data

| | Wide angle | Intermediate2 | Telephoto |
|---|---|---|---|
| Focal length | 4.55 | 28.21 | 174.87 |
| Fno. | 3.88 | 5.00 | 6.40 |
| IH | 3.53 | 4.16 | 4.16 |
| 2ω | 84.8 | 16.0 | 2.7 |
| fb(in air) | 9.63 | 5.39 | 2.46 |
| Lens total length(in air) | 59.23 | 78.73 | 95.33 |
| d8 | 0.44 | 19.92 | 29.43 |
| d14 | 17.47 | 6.70 | 0.50 |
| d20 | 0.80 | 14.91 | 8.99 |
| d22 | 3.17 | 4.08 | 26.23 |
| d24 | 8.57 | 4.33 | 1.40 |

| | Intermediate1 | Intermediate3 |
|---|---|---|
| Focal length | 11.33 | 70.23 |
| Fno. | 4.40 | 6.10 |
| IH | 4.16 | 4.16 |
| 2ω | 39.2 | 6.6 |
| fb(in air) | 7.79 | 3.08 |
| Lens total length(in air) | 65.04 | 84.73 |
| d8 | 7.87 | 26.85 |
| d14 | 9.07 | 4.03 |
| d20 | 10.90 | 14.94 |
| d22 | 1.68 | 8.11 |
| d24 | 6.73 | 2.02 |

Unit focal length f1 = 43.01    f2 = −5.57    f3 = 11.90    f4 = −28.67    f5 = 19.33

Example 7

Unit mm

Surface data

| Surface no. | r | d | nd | vd |
|---|---|---|---|---|
| Object plane | ∞ | ∞ | | |
| 1 | 77.370 | 1.00 | 1.91082 | 35.25 |
| 2 | 37.006 | 0.13 | | |
| 3 | 38.955 | 3.00 | 1.49700 | 81.54 |
| 4 | −2000.000 | 0.10 | | |
| 5 | 34.434 | 3.03 | 1.43875 | 94.93 |
| 6 | 343.788 | 0.10 | | |
| 7 | 28.937 | 2.97 | 1.43875 | 94.93 |
| 8 | 125.948 | Variable | | |
| 9* | −29.340 | 0.40 | 1.86400 | 40.58 |
| 10* | 7.822 | 2.10 | | |
| 11 | −9.841 | 0.45 | 1.72916 | 54.68 |
| 12 | 18.193 | 0.54 | | |
| 13 | 20.934 | 1.45 | 1.94595 | 17.98 |
| 14 | −38.153 | Variable | | |
| 15(stop) | ∞ | 0.50 | | |
| 16* | 6.678 | 2.62 | 1.58313 | 59.46 |
| 17* | −28.041 | 0.79 | | |
| 18 | 28.952 | 0.80 | 1.91082 | 35.25 |
| 19 | 4.989 | 2.86 | 1.48749 | 70.23 |
| 20* | −14.515 | Variable | | |
| 21 | 486.610 | 0.58 | 1.49700 | 81.54 |
| 22* | 12.431 | Variable | | |
| 23* | 20.359 | 1.71 | 1.49710 | 81.56 |
| 24* | −13.318 | 0.12 | | |
| 25 | −21.300 | 0.36 | 1.80440 | 39.59 |
| 26 | −27.293 | Variable | | |
| 27 | ∞ | 1.00 | 1.51633 | 64.14 |
| 28 | ∞ | 0.40 | | |
| Image plane (Image pickup surface) | ∞ | | | |

Aspherical surface data

9th surface k = 0.000
A4 = 4.75888e−04, A6 = −4.84163e−06, A8 = −4.61247e−08,
A10 = 1.91567e−09
10th surface k = 0.000
A4 = 3.05511e−04, A6 = 7.96439e−06, A8 = −4.67707e−07,
A10 = 3.18936e−08
16th surface k = 0.000
A4 = −3.40099e−04, A6 = −1.19695e−06, A8 = −1.11057e−07,
A10 = 1.97228e−09
17th surface k = 0.000
A4 = 2.42137e−04, A6 = −1.18219e−06, A8 = 4.72774e−08,
A10 = 1.98463e−09
20th surface k = 0.000
A4 = −1.02403e−04, A6 = −3.30056e−06, A8 = −2.57322e−08,
A10 = −1.85061e−08
22th surface k = 0.000
A4 = −2.29882e−05, A6 = 3.20844e−06, A8 = −2.47246e−08,
A10 = 1.22198e−08
23th surface k = 0.000
A4 = 1.43207e−04, A6 = −1.90161e−05, A8 = 1.31754e−06,
A10 = −2.63736e−08
24th surface k = 0.000
A4 = 3.75312e−04, A6 = −3.36777e−06

Zoom data

| | Wide angle | Intermediate2 | Telephoto |
|---|---|---|---|
| Focal length | 4.55 | 28.21 | 174.87 |
| Fno. | 3.88 | 5.00 | 6.83 |
| IH | 3.53 | 4.16 | 4.16 |
| 2ω | 85.4 | 16.1 | 2.7 |
| fb(in air) | 8.62 | 4.81 | 2.46 |
| Lens total length(in air) | 56.93 | 75.70 | 94.73 |
| d8 | 0.46 | 20.16 | 29.59 |
| d14 | 17.18 | 6.25 | 0.50 |
| d20 | 1.83 | 15.23 | 10.36 |
| d22 | 3.22 | 3.64 | 26.19 |
| d26 | 7.56 | 3.75 | 1.40 |

| | Intermediate1 | Intermediate3 |
|---|---|---|
| Focal length | 11.33 | 70.23 |
| Fno. | 4.40 | 6.10 |

-continued

| Unit mm | | |
|---|---|---|
| IH | 4.16 | 4.16 |
| 2ω | 39.1 | 6.6 |
| fb(in air) | 7.00 | 2.46 |
| Lens total length(in air) | 62.49 | 82.53 |
| d8 | 8.62 | 26.98 |
| d14 | 8.87 | 3.80 |
| d20 | 10.94 | 14.97 |
| d22 | 1.44 | 8.69 |
| d26 | 5.94 | 1.40 |

| Unit focal length | | | | |
|---|---|---|---|---|
| f1 = 43.12 | f2 = −5.52 | f3 = 11.34 | f4 = −25.68 | f5 = 19.03 |

Example 8

| Unit mm | | | | |
|---|---|---|---|---|
| Surface data | | | | |
| Surface no. | r | d | nd | vd |
| Object plane | ∞ | ∞ | | |
| 1 | 76.797 | 1.00 | 1.91082 | 35.25 |
| 2 | 36.937 | 0.14 | | |
| 3 | 38.956 | 2.99 | 1.49700 | 81.54 |
| 4 | −2000.000 | 0.10 | | |
| 5 | 34.300 | 3.03 | 1.43875 | 94.93 |
| 6 | 330.561 | 0.10 | | |
| 7 | 29.129 | 2.95 | 1.43875 | 94.93 |
| 8 | 127.943 | Variable | | |
| 9* | −29.431 | 0.40 | 1.86400 | 40.58 |
| 10* | 7.934 | 2.13 | | |
| 11 | −9.728 | 0.45 | 1.72916 | 54.68 |
| 12 | 18.262 | 0.54 | | |
| 13 | 21.117 | 1.44 | 1.94595 | 17.98 |
| 14 | −38.768 | Variable | | |
| 15(stop) | ∞ | 0.50 | | |
| 16* | 6.776 | 2.61 | 1.58313 | 59.46 |
| 17* | −26.062 | 0.90 | | |
| 18 | 31.424 | 0.80 | 1.91082 | 35.25 |
| 19 | 5.051 | 2.86 | 1.48749 | 70.23 |
| 20* | −14.050 | Variable | | |
| 21 | ∞ | 0.40 | 1.49700 | 81.54 |
| 22 | 8.768 | 0.11 | | |
| 23 | 9.300 | 0.44 | 1.51633 | 64.14 |
| 24* | 13.721 | Variable | | |
| 25* | 21.004 | 1.76 | 1.49710 | 81.56 |
| 26* | −11.279 | 0.12 | | |
| 27 | −21.300 | 0.36 | 1.80440 | 39.59 |
| 28 | −34.360 | Variable | | |
| 29 | ∞ | 1.00 | 1.51633 | 64.14 |
| 30 | ∞ | 0.40 | | |
| Image plane (Image pickup surface) | ∞ | | | |

Aspherical surface data

9th surface k = 0.000
A4 = 4.76328e−04, A6 = −4.27053e−06, A8 = −2.38538e−08,
A10 = 1.22320e−09

10th surface k = 0.000
A4 = 3.12905e−04, A6 = 8.26113e−06, A8 = −5.12817e−07,
A10 = 4.04000e−08

16th surface k = 0.000
A4 = −3.31610e−04, A6 = −1.54498e−06, A8 = −1.23895e−07,
A10 = 3.08278e−09

-continued

| Unit mm |
|---|

17th surface k = 0.000
A4 = 2.55408e−04, A6 = −2.20119e−06, A8 = 6.28543e−08,
A10 = 2.29430e−09

20th surface k = 0.000
A4 = −1.17194e−04, A6 = −2.80936e−06, A8 = −1.04559e−07,
A10 = −1.75334e−08

24th surface k = 0.000
A4 = −3.05045e−05, A6 = 6.39706e−06, A8 = −4.80035e−07,
A10 = 2.54192e−08

25th surface k = 0.000
A4 = −1.73738e−04, A6 = 2.41050e−05, A8 = −8.73902e−07,
A10 = 2.56806e−08

26th surface k = 0.000
A4 = 1.13879e−04, A6 = 2.90597e−05, A8 = −1.20098e−06,
A10 = 2.77084e−08

| Zoom data | | | |
|---|---|---|---|
| | Wide angle | Intermediate2 | Telephoto |
| Focal length | 4.55 | 28.21 | 174.87 |
| Fno. | 3.88 | 5.00 | 6.83 |
| IH | 3.53 | 4.16 | 4.16 |
| 2ω | 85.1 | 16.1 | 2.7 |
| fb(in air) | 8.71 | 4.70 | 2.46 |
| Lens total length(in air) | 56.91 | 76.01 | 95.03 |
| d8 | 0.45 | 20.15 | 29.59 |
| d14 | 17.04 | 6.31 | 0.50 |
| d20 | 1.62 | 15.00 | 10.46 |
| d24 | 2.94 | 3.71 | 25.88 |
| d28 | 7.65 | 3.64 | 1.40 |

| | Intermediate1 | Intermediate3 |
|---|---|---|
| Focal length | 11.33 | 70.23 |
| Fno. | 4.40 | 6.10 |
| IH | 4.16 | 4.16 |
| 2ω | 39.1 | 6.6 |
| fb(in air) | 6.98 | 2.46 |
| Lens total length(in air) | 62.70 | 82.83 |
| d8 | 8.49 | 26.96 |
| d14 | 8.85 | 3.78 |
| d20 | 10.80 | 15.10 |
| d24 | 1.44 | 8.39 |
| d28 | 5.92 | 1.40 |

| Unit focal length | | | | |
|---|---|---|---|---|
| f1 = 43.14 | f2 = −5.50 | f3 = 11.37 | f4 = −25.85 | f5 = 19.04 |

FIGS. 9A to 9L, 10A to 10L, 11A to 11L, 12A to 12L, 13A to 13L, 14A to 14L, 15A to 15L, and 16A to 16L are aberration diagrams of the zoom lenses according to the first to eighth examples in the state in which the zoom lenses are focused on an object at infinity. In these diagrams, "FIY" represents the largest image height.

Among these aberration diagrams, FIGS. 9A, 10A, 11A, 12A, 13A, 14A, 15A, and 16A show spherical aberration (SA) at the wide angle end, FIGS. 9B, 10B, 11B, 12B, 13B, 14B, 15B, and 16B show astigmatism (SA) at the wide angle end, FIGS. 9C, 10C, 11C, 12C, 13C, 14C, 15C, and 16C show distortion (DT) at the wide angle end, and FIGS. 9D, 10D, 11D, 12D, 13D, 14D, 15D, and 16D show chromatic aberration of magnification (CC) at the wide angle end.

FIGS. 9E 10E, 11E, 12E, 13E, 14E, 15E, and 16E show spherical aberration (SA) in the first intermediate focal length state, FIGS. 9F, 10F, 11F, 12F, 13F, 14F, 15F, and 16F show astigmatism (SA) in the first intermediate focal length state, FIGS. 9G, 10G, 11G, 12G, 13G, 14G, 15G, and 16G show distortion (DT) in the first intermediate focal length state, and FIGS. 9H, 10H, 11H, 12H, 13H, 14H, 15H, and 16H show chromatic aberration of magnification (CC) in the first intermediate focal length state.

FIGS. 9I, 10I, 11I, 12I, 13I, 14I, 15I, and 16I show spherical aberration (SA) at the telephoto end, FIGS. 9J, 10J, 11J, 12J, 13J, 14J, 15J, and 16J show astigmatism (SA) at the telephoto end, FIGS. 9K, 10K, 11K, 12K, 13K, 14K, 15K, and 16K show distortion (DT) at the telephoto end, and FIGS. 9L, 10L, 11L, 12L, 13L, 14L, 15L, and 16L show chromatic aberration of magnification (CC) at the telephoto end.

In the following the values of the terms in conditional expressions (1) to (16), and (A) and (B) are presented for the each of the examples. Some examples lack the values of some terms due to the lack of a feature(s) (or component(s)) associated with the corresponding conditional expressions.

|  | Example1 | Example2 | Example3 | Example4 |
|---|---|---|---|---|
| (1) $f_t/f_w$ | 38.43 | 28.79 | 38.43 | 28.79 |
| (2) $\arctan(IH_{MAX}/f_w)$ | 40.3 | 42.4 | 42.4 | 42.4 |
| (3) $TL_t/f_t$ | 0.542 | 0.596 | 0.527 | 0.596 |
| (4) vd(L1) | 81.54 | 94.93 | 81.54 | 81.54 |
| (4) vd(L3) | 94.93 | 68.63 | 81.54 | 81.54 |
| (4) vd(L4) | 94.93 | — | — | — |
| (5) $d_{P1P}/D_{1P}$ | 0.291 | 0.459 | 0.488 | 0.468 |
| (6) $vd_{N2N}$ | 81.54 | 64.14 | 64.14 | 64.14 |
| (7) $f_{1P}/f_t$ | 0.244 | 0.291 | 0.239 | 0.306 |
| (8) $f_{1N}/f_t$ | −0.032 | −0.043 | −0.032 | −0.044 |
| (9) $f_{2P}/f_t$ | 0.066 | 0.075 | 0.064 | 0.077 |
| (10) $f_{2N}/f_t$ | −0.155 | −0.11 | −0.155 | −0.113 |
| (11) $f_{3P}/f_t$ | 0.111 | 0.127 | 0.117 | 0.125 |
| (12) $D_{1P}/TL_w$ | 0.184 | 0.145 | 0.169 | 0.134 |
| (13) $D_{1P}/D_{1N}$ | 2.108 | 1.433 | 1.878 | 1.398 |
| (14) $(TL_t - TL_w)/TL_w$ | 0.678 | 0.467 | 0.64 | 0.467 |
| (15) $ME_{1Pw}/ME_{1Nw}$ | 2.628 | 2.172 | 2.61 | 2.159 |
| (16) $SF_1$ | −0.962 | −0.648 | −0.822 | −0.858 |
| (16) $SF_2$ | −1.232 | −1.235 | −1.34 | −1.609 |
| (16) $SF_3$ | −1.515 | — | — | — |
| (A), (B) $S_{1P}$ | 4 | 3 | 3 | 3 |
| (A), (B) $S_{1N}$ | 3 | 3 | 3 | 3 |
| (A), (B) $S_{2P}$ | 3 | 3 | 3 | 3 |
| (A), (B) $S_{2N}$ | 1 | 1 | 1 | 1 |
| (A), (B) $S_{3P}$ | 1 | 1 | 1 | 1 |

|  | Example5 | Example6 | Example7 | Example8 |
|---|---|---|---|---|
| (1) $f_t/f_w$ | 38.43 | 38.43 | 38.43 | 38.43 |
| (2) $\arctan(IH_{MAX}/f_w)$ | 42.4 | 42.4 | 42.4 | 42.4 |
| (3) $TL_t/f_t$ | 0.53 | 0.545 | 0.544 | 0.543 |
| (4) vd(L1) | 81.54 | 81.54 | 81.54 | 81.54 |
| (4) vd(L3) | 90.28 | 94.93 | 94.93 | 94.93 |
| (4) vd(L4) | 90.28 | 94.93 | 94.93 | 94.93 |
| (5) $d_{P1P}/D_{1P}$ | 0.307 | 0.298 | 0.294 | 0.294 |
| (6) $vd_{N2N}$ | 64.14 | 81.54 | 81.54 | 81.54 |
| (7) $f_{1P}/f_t$ | 0.236 | 0.246 | 0.247 | 0.247 |
| (8) $_{1N}/f_t$ | −0.031 | −0.032 | −0.032 | −0.031 |
| (9) $f_{2P}/f_t$ | 0.064 | 0.068 | 0.065 | 0.065 |
| (10) $f_{2N}/f_t$ | −0.151 | −0.164 | −0.147 | −0.148 |
| (11) $f_{3P}/f_t$ | 0.114 | 0.111 | 0.109 | 0.109 |
| (12) $D_{1P}/TL_w$ | 0.185 | 0.192 | 0.18 | 0.181 |
| (13) $D_{1P}/D_{1N}$ | 2.074 | 2.262 | 2.09 | 2.074 |
| (14) $(TL_t - TL_w)/TL_w$ | 0.649 | 0.609 | 0.66 | 0.67 |
| (15) $ME_{1Pw}/ME_{1Nw}$ | 2.675 | 2.764 | 2.624 | 2.611 |
| (16) $SF_1$ | −0.862 | −0.963 | −0.962 | −0.962 |
| (16) $SF_2$ | −1.274 | −1.151 | −1.223 | −1.232 |
| (16) $SF_3$ | −1.639 | −1.526 | −1.597 | −1.59 |
| (A), (B) $S_{1P}$ | 4 | 4 | 4 | 4 |
| (A), (B) $S_{1N}$ | 3 | 3 | 3 | 3 |
| (A), (B) $S_{2P}$ | 3 | 3 | 3 | 3 |
| (A), (B) $S_{2N}$ | 1 | 1 | 1 | 2 |
| (A), (B) $S_{3P}$ | 1 | 1 | 2 | 2 |

The distance to the object (or working distance) in the state in which the zoom lens is focused on an object at a close distance (first extremely close distance) is presented below for each of the examples.

|  | Ex. 1 | Ex. 2 | Ex. 3 | Ex. 4 |
|---|---|---|---|---|
| Wide angle end | 150 | 150 | 150 | 150 |
| Intermediate 2 | 600 | 400 | 600 | 400 |
| Telephoto end | 1800 | 800 | 1800 | 800 |

|  | Ex. 5 | Ex. 6 | Ex. 7 | Ex. 8 |
|---|---|---|---|---|
| Wide angle end | 150 | 150 | 150 | 150 |
| Intermediate 2 | 600 | 400 | 500 | 500 |
| Telephoto end | 1800 | 800 | 1000 | 1000 |

The amount of movement of the fourth lens unit for focusing from an object at infinity to an object at an extremely close distance (first extremely close distance) is presented below for each of the examples. The fourth lens unit moves toward the image side for focusing. The amount of movement of the fourth lens unit has positive values, because movement from the object side to the image side is represented by a positive value.

|  | Ex. 1 | Ex. 2 | Ex. 3 | Ex. 4 |
|---|---|---|---|---|
| Wide angle end | 0.222 | 0.102 | 0.198 | 0.108 |
| Intermediate 2 | 2.438 | 1.026 | 1.272 | 1.016 |
| Telephoto end | 6.847 | 5.108 | 5.393 | 5.846 |

|  | Ex. 5 | Ex. 6 | Ex. 7 | Ex. 8 |
|---|---|---|---|---|
| Wide angle end | 0.191 | 0.221 | 0.197 | 0.199 |
| Intermediate 2 | 1.938 | 3.409 | 2.586 | 2.545 |
| Telephoto end | 5.774 | 22.678 | 13.659 | 13.962 |

Figure 17:
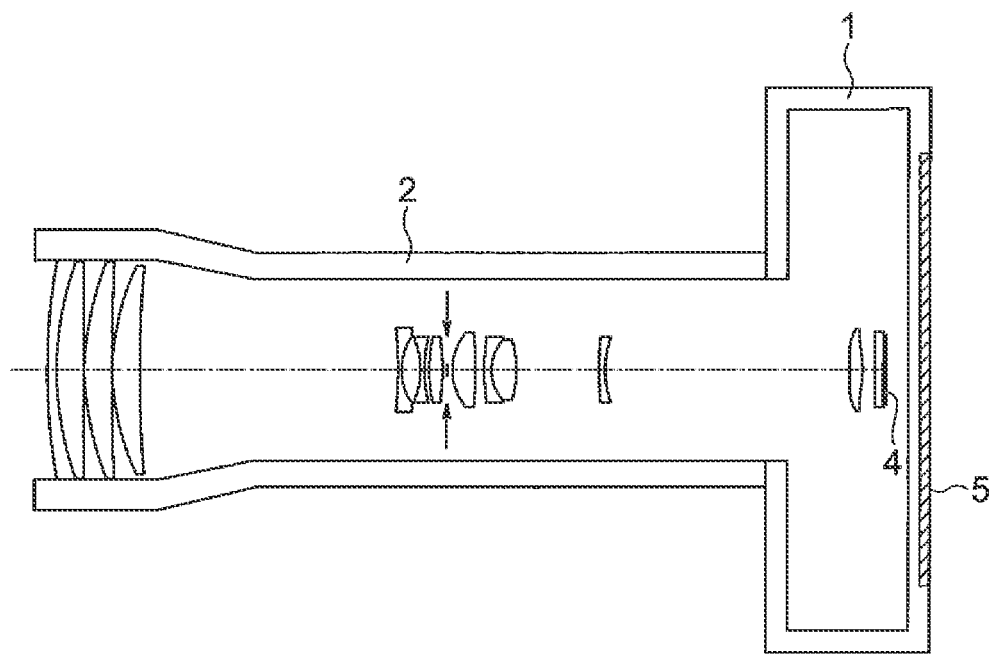
FIG. 17 is a cross sectional view of a digital camera equipped with a zoom lens according to the present invention.

FIG. 17 is a cross sectional view of a compact camera 1 as an image pickup apparatus using a zoom lens according to the present invention and a small CCD or CMOS sensor as an image pickup element. A taking lens system 2 is housed in the lens barrel of the compact camera 1, and an image pickup surface 4 and a rear monitor 5 are arranged in the body.

The lens barrel may be provided with a mount portion, with which the taking lens system. 2 can be detachably mounted on the body of a single lens mirror-less camera. The mount portion may be, for example, a screw mount or a bayonet mount.

As the taking lens system 2 of the compact camera 1, a zoom lens according to the present invention, for example, a zoom lens according to one of the first to eighth examples is used.

Figure 18:
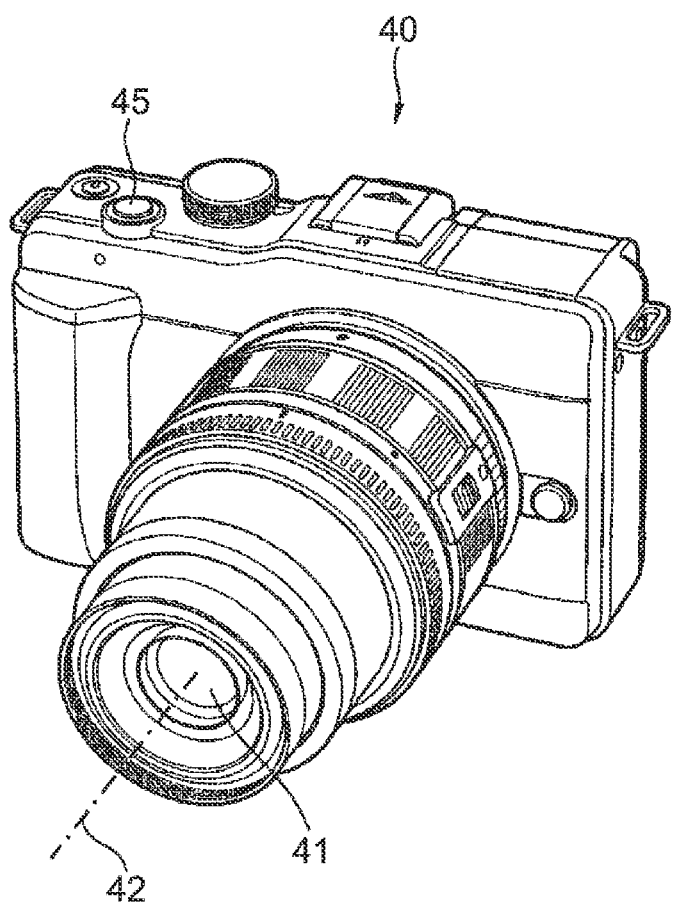
FIG. 18 is a front perspective view showing the outer appearance of the digital camera.
Figure 19:
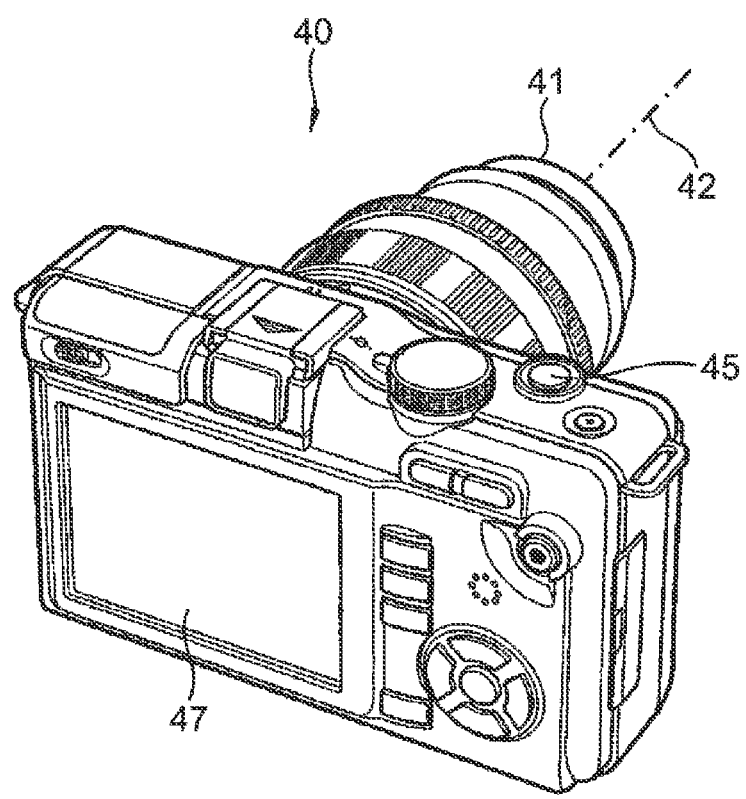
FIG. 19 is a rear perspective view showing the outer appearance of the digital camera.

FIGS. 18 and 19 schematically show the construction of an image pickup apparatus according to the present invention which is equipped with a zoom lens as a taking optical system 41. FIG. 18 is a front perspective view showing the outer appearance of a digital camera 40 as the image pickup apparatus. FIG. 19 is a rear perspective view of the digital camera 40.

The digital camera 40 according to this embodiment has the taking optical system 41 arranged in the taking optical path 42, a shutter release button 45, and a liquid crystal display monitor 47. In response to depression of the shutter release button 45 provided on the top of the digital camera 40, shooting through the taking optical system 41, e.g. the zoom lens according to the first example, is effected. Specifically, an image of an object is formed by the taking optical system 41 on the image pickup element (photoelectric conversion surface) provided in the vicinity of the image plane. The image of the object picked up by the image pickup element is processed by a processing unit and displayed as an electronic image on the liquid crystal display monitor 47 provided on the back of the camera. The picked-up electronic image can be stored in a storage unit.

Figure 20:
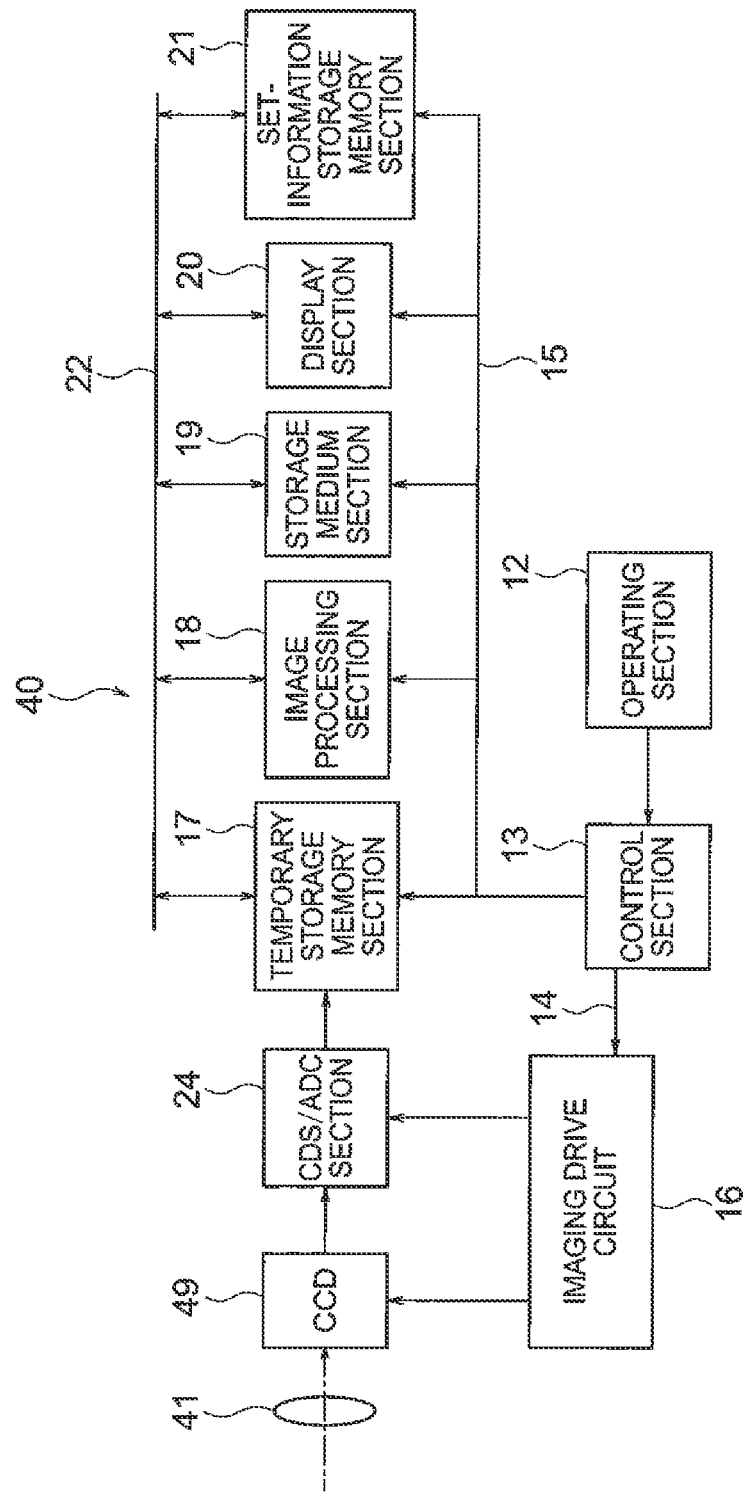
FIG. 20 is a block diagram showing the relevant interval circuit configuration of the digital camera.

FIG. 20 is a block diagram showing the relevant internal circuit of the digital camera 40. In the case described hereinafter, the processing unit mentioned above includes, for instance, a CDS/ADC section 24, a temporary storage memory 17, and an image processing section 18, and the storage unit includes a storage medium 19 for example.

As shown in FIG. 20, the digital camera 40 has an operating section 12 and a control section 13 connected to the operating section 12. The digital camera 40 also has an image pickup drive circuit 16, the temporary storage memory 17, the image processing section 18, the storage medium 19, a display section 20, and a set-information storage memory section 21, which are connected to control signal output ports of the control section 13 via buses 14 and 15.

The temporary storage memory 17, the image processing section 18, the storage medium section 19, the display section 20, and the set-information storage memory section 21 are configured to be capable of mutually inputting and outputting data via a bus 22. Moreover, a CCD 49 and the CDS/ADC section 24 are connected to the image pickup drive circuit 16.

The operating section 12 is equipped with various entry buttons and switches and notifies the control section 13 of event information entered from outside (by a user of the camera) through the entry buttons and switches. The control section 13 is a central processing device such as a CPU and has a built-in program memory, which is not shown in the drawings. The control section 13 performs overall control of the digital camera 40 according to a program stored in the program memory.

The CCD 49 is an image pickup element that is driven and controlled by the image pickup drive circuit 16 to convert the quantity of light of the object image formed through the taking optical system 41 into an electrical signal on a pixel-by-pixel basis and to output it to the CDS/ADC section 24.

The CDS/ADC section 24 is a circuit that amplifies the electrical signals input from the CCD 49, performs analog-to-digital conversion, and outputs to the temporary storage memory 17 raw image data (or Bayer data, which will be hereinafter referred to as "RAW data") that has undergone only amplification and digital conversion.

The temporary storage memory 17 may include, for example, an SDRAM, which serves as a buffer. The temporary storage memory 17 is a memory device that temporarily stores the RAW data output from the CDS/ADC section 24. The image processing section 18 is a circuit that retrieves RAW data stored in the temporary storage memory 17 or RAW data stored in the storage medium section 19 and performs various electrical image processing including distortion correction based on image quality parameters specified by the control section 13.

The storage medium section 19 allows a detachable mounting of a recording medium such as, for example, a card-type or stick-type flash memory. The storage medium section 19 records or writes RAW data transferred from the temporary storage memory 17 and image data having been processed in the image processing section 18 in the flash memory to have the data stored in it.

The display section 20 includes the liquid-crystal display monitor 47 and displays images based on picked-up RAW data, image data, and operation menu etc. The set-information storage memory section 21 includes a ROM section in which various image quality parameters are stored in advance and a RAM section for storing image quality parameters read out from the ROM section in response to an entry(ies) made through the operating section 12.

The digital camera 40 having the above-described construction uses as the taking optical system 41 the zoom lens according to the present invention. Thus, the digital camera 40 can be an image pickup apparatus that is small in size and easy to use in various shooting situations while having a high zoom ratio or an image pickup apparatus that is small in size and has an advantageous design in performance wise.

As described in the foregoing, the present invention can suitably applied to an image pickup apparatus that is small in size and easy to use in various shooting situations while having a high zoom ratio or an image pickup apparatus that is small in size and has an advantageous design in performance wise. The zoom lens according to the present invention can suitably used as an optical system of such an image pickup apparatus.

What is claimed is:

1. An image pickup apparatus comprising:
a zoom lens, and
an image pickup element arranged on the image side of the zoom lens, wherein
the image pickup apparatus has an image pickup surface and converts an image formed by the zoom lens into an electrical signal,
the zoom lens comprises a first positive lens unit having a positive refractive power located closest to the object side, a first negative lens unit having a negative refractive power arranged on the image side of the first positive lens unit, and an image side lens unit group arranged on the image side of the first negative lens unit,
the first positive lens unit is located closer to the object side at the telephoto end than at the wide angle end,
the distance between the first negative lens unit and the first positive lens unit is larger at the telephoto end than at the wide angle end,
the distance between the image side lens unit group and the first negative lens unit varies during zooming from the wide angle end to the telephoto end,
the image side lens unit group comprises a second positive lens unit having a positive refractive power and a third positive lens unit having a positive refractive power and arranged closer to the image side than the second positive lens unit,
the distance between the second positive lens unit and the first negative lens unit is smaller at the telephoto end than at the wide angle end,
the distance between the third positive lens unit and the second positive lens unit varies during zooming from the wide angle end to the telephoto end, the first positive lens unit comprises a plurality of positive lens and at least one negative lens, an aperture stop is arranged between the first negative lens unit and a portion of the image side lens unit group, at the telephoto end, the aperture stop is located closer to the object side than a position of a surface vertex of a lens which is positioned closer to the object side among lenses in the image side lens unit group, and the following conditional expressions (2) and (3) are satisfied:

$$32°<\arctan(IH_{MAX}/f_w)<55° \quad (2), \text{ and}$$

$$0.45<TL_t/f_t<0.70 \quad (3),$$

where $f_t$ is the focal length of the entire zoom lens system at the telephoto end, $f_w$ is the focal length of the entire zoom lens system at the wide angle end, $IH_{MAX}$ is the largest image height of the image formed on the image pickup surface or the largest value thereof if the value of the largest image height varies, $TL_t=TZL_t+FB_t$, where $TZL_t$ is the distance on the optical axis from the object side surface to the image side surface of the zoom lens at the telephoto end, and $FB_t$ is the back focus of the zoom lens at the telephoto end expressed in the equivalent air distance.

2. The image pickup apparatus according to claim 1, wherein the following conditional expression (3-1) is satisfied:

$$0.45<TL_t/f_t<0.65 \quad (3-1),$$

where $f_t$ is the focal length of the entire zoom lens system at the telephoto end, $TL_t=TZL_t+FB_t$, where $TZL_t$ is the distance on the optical axis from the object side surface to the image side surface of the zoom lens at the telephoto end, and $FB_t$ is the back focus of the zoom lens at the telephoto end expressed in the equivalent air distance.

3. The image pickup apparatus according to claim 2, wherein the following conditional expression (1-1) is satisfied:

$$20<f_t/f_w \quad (1-1),$$

where $f_t$ is the focal length of the entire zoom lens system at the telephoto end, $f_w$ is the focal length of the entire zoom lens system at the wide angle end.

4. The image pickup apparatus according to claim 2, wherein the first positive lens unit comprises two positive lenses and one negative lens, the total number of lenses included in the first positive lens unit is three, and a specific positive lens having the largest thickness on the optical axis among the positive lenses in the first positive lens unit satisfies the following conditional expression (5):

$$0.25<d_{P1P}/D_{1P}<0.55 \quad (5),$$

where $d_{P1P}$ is the thickness of the specific positive lens on the optical axis, and $D_{1P}$ is the thickness of the first positive lens unit on the optical axis.

5. The image pickup apparatus according to claim 4, wherein the image side lens unit group comprises a second negative lens unit having a negative refractive power arranged between the second positive lens unit and the third positive lens unit, and the distance between the second negative lens unit and the second positive lens unit and the distance between the second negative lens unit and the third positive lens unit vary during zooming from the wide angle end to the telephoto end.

6. The image pickup apparatus according to claim 5, wherein the following conditional expression (10) is satisfied:

$$-0.25<f_{2N}/f_t<-0.05 \quad (10),$$

where $f_{2N}$ is the focal length of the second negative lens unit, and $f_t$ is the focal length of the entire zoom lens system at the telephoto end.

7. The image pickup apparatus according to claim 5, wherein the third positive lens unit consists of one lens component, where the lens component is a lens block having only two surfaces, namely, an object-side surface and an image-side surface, are in contact with air.

8. The image pickup apparatus according to claim 7, wherein the following conditional expression (14) is satisfied:

$$0.4<(TL_t-TL_w)/TL_w \quad (14),$$

where $TL_t=TZL_t+FB_t$, and $TL_w=TZL_w+FB_w$, where $TZL_t$ is the distance on the optical axis from the object side surface to the image side surface of the zoom lens at the telephoto end, $FB_t$ is the back focus of the zoom lens at the telephoto end expressed in the equivalent air distance, $TZL_w$ is the distance on the optical axis from the object side surface to the image side surface of the zoom lens at the wide angle end, and $FB_w$ is the back focus of the zoom lens at the wide angle end expressed in the equivalent air distance.

9. The image pickup apparatus according to claim 8, wherein the first negative lens unit comprises in order from an object side, a negative lens, a negative lens, and a positive lens.

10. The image pickup apparatus according to claim 9, wherein the following conditional expressions (7) and (8) are satisfied:

$$0.1<f_{1P}/f_t<0.5 \quad (7), \text{ and}$$

$$-0.15<f_{1N}/f_t<-0.02 \quad (8),$$

where $f_{1P}$ is the focal length of the first positive lens unit, $f_{1N}$ is the focal length of the first negative lens unit, and $f_t$ is the focal length of the entire zoom lens system at the telephoto end.

11. The image pickup apparatus according to claim 10, wherein the following conditional expressions (9) and (11) are satisfied:

$$0.05<f_{2P}/f_t<0.15 \quad (9), \text{ and}$$

$$0.05<f_{3P}/f_t<0.20 \quad (11),$$

where $f_{2P}$ is the focal length of the second positive lens unit, $f_{3P}$ is the focal length of the third positive lens unit, and $f_t$ is the focal length of the entire zoom lens system at the telephoto end.

12. The image pickup apparatus according to claim 2, wherein the image side lens unit group comprises a second negative lens unit having a negative refractive power arranged between the second positive lens unit and the third positive lens unit, and the distance between the second negative lens unit and the second positive lens unit and the distance between the second negative lens unit and the third positive lens unit vary during zooming from the wide angle end to the telephoto end.

13. The image pickup apparatus according to claim 12, wherein the following conditional expression (10) is satisfied:

$$-0.25<f_{2N}/f_t<-0.05 \quad (10),$$

where $f_{2N}$ is the focal length of the second negative lens unit, and $f_t$ is the focal length of the entire zoom lens system at the telephoto end.

14. The image pickup apparatus according to claim 2, wherein the third positive lens unit consists of one lens component,
where the lens component is a lens block having only two surfaces, namely, an object-side surface and an image-side surface, are in contact with air.

15. The image pickup apparatus according to claim 2, wherein the following conditional expression (14) is satisfied:

$$0.4 < (TL_t - TL_w)/TL_w \quad (14),$$

where $TL_t = TZL_t + FB_t$, and $TL_w = TZL_w + FB_w$, where $TZL_t$ is the distance on the optical axis from the object side surface to the image side surface of the zoom lens at the telephoto end, $FB_t$ is the back focus of the zoom lens at the telephoto end expressed in the equivalent air distance, $TZL_w$ is the distance on the optical axis from the object side surface to the image side surface of the zoom lens at the wide angle end, and $FB_w$ is the back focus of the zoom lens at the wide angle end expressed in the equivalent air distance.

16. The image pickup apparatus according to claim 2, wherein the first negative lens unit comprises in order from an object side, a negative lens, a negative lens, and a positive lens.

17. The image pickup apparatus according to claim 2, wherein the following conditional expressions (7) and (8) are satisfied:

$$0.1 < f_{1P}/f_t < 0.5 \quad (7), \text{ and}$$

$$-0.15 < f_{1N}/f_t < -0.02 \quad (8),$$

where $f_{1P}$ is the focal length of the first positive lens unit, $f_{1N}$ is the focal length of the first negative lens unit, and $f_t$ is the focal length of the entire zoom lens system at the telephoto end.

18. The image pickup apparatus according to claim 2, wherein the following conditional expressions (9) and (11) are satisfied:

$$0.05 < f_{2P}/f_t < 0.15 \quad (9), \text{ and}$$

$$0.05 f_{3P}/f_t < 0.20 \quad (11),$$

where $f_{2P}$ is the focal length of the second positive lens unit, $f_{3P}$ is the focal length of the third positive lens unit, and $f_t$ is the focal length of the entire zoom lens system at the telephoto end.

19. The image pickup apparatus according to claim 1, wherein the following conditional expression (1-1) is satisfied:

$$20 < f_t/f_w \quad (1-1),$$

where $f_t$ is the focal length of the entire zoom lens system at the telephoto end, $f_w$ is the focal length of the entire zoom lens system at the wide angle end.

20. The image pickup apparatus according to claim 19, wherein the first positive lens unit comprises two positive lenses and one negative lens, the total number of lenses included in the first positive lens unit is three, and a specific positive lens having the largest thickness on the optical axis among the positive lenses in the first positive lens unit satisfies the following conditional expression (5):

$$0.25 d_{P1P}/D_{1P} < 0.55 \quad (5),$$

where $d_{P1P}$ is the thickness of the specific positive lens on the optical axis, and $D_{1P}$ is the thickness of the first positive lens unit on the optical axis.

21. The image pickup apparatus according to claim 19, wherein the image side lens unit group comprises a second negative lens unit having a negative refractive power arranged between the second positive lens unit and the third positive lens unit, and the distance between the second negative lens unit and the second positive lens unit and the distance between the second negative lens unit and the third positive lens unit vary during zooming from the wide angle end to the telephoto end.

22. The image pickup apparatus according to claim 21, wherein the following conditional expression (10) is satisfied:

$$-0.25 < f_{2N}/f_t < -0.05 \quad (10),$$

where $f_{2N}$ is the focal length of the second negative lens unit, and $f_t$ is the focal length of the entire zoom lens system at the telephoto end.

23. The image pickup apparatus according to claim 19, wherein the third positive lens unit consists of one lens component,
where the lens component is a lens block having only two surfaces, namely, an object-side surface and an image-side surface, are in contact with air.

24. The image pickup apparatus according to claim 19, wherein the following conditional expression (14) is satisfied:

$$0.4 < (TL_t - TL_w)/TL_w \quad (14),$$

where $TL_t = TZL_t + FB_t$, and $TL_w = TZL_w + FB_w$, where $TZL_t$ is the distance on the optical axis from the object side surface to the image side surface of the zoom lens at the telephoto end, $FB_t$ is the back focus of the zoom lens at the telephoto end expressed in the equivalent air distance, $TZL_w$ is the distance on the optical axis from the object side surface to the image side surface of the zoom lens at the wide angle end, and $FB_w$ is the back focus of the zoom lens at the wide angle end expressed in the equivalent air distance.

25. The image pickup apparatus according to claim 19, wherein the first negative lens unit comprises in order from an object side, a negative lens, a negative lens, and a positive lens.

26. The image pickup apparatus according to claim 19, wherein the following conditional expressions (7) and (8) are satisfied:

$$0.1 < f_{1P}/f_t < 0.5 \quad (7), \text{ and}$$

$$-0.15 < f_{1N}/f_t < -0.02 \quad (8),$$

where $f_{1P}$ is the focal length of the first positive lens unit, $f_{1N}$ is the focal length of the first negative lens unit, and $f_t$ is the focal length of the entire zoom lens system at the telephoto end.

27. The image pickup apparatus according to claim 19, wherein the following conditional expressions (9) and (11) are satisfied:

$$0.05 < f_{2P}/f_t < 0.15 \quad (9), \text{ and}$$

$$0.05 f_{3P}/f_t < 0.20 \quad (11),$$

where $f_{2P}$ is the focal length of the second positive lens unit, $f_{3P}$ is the focal length of the third positive lens unit, and $f_t$ is the focal length of the entire zoom lens system at the telephoto end.

28. The image pickup apparatus according to claim 1, wherein the first positive lens unit comprises two positive lenses and one negative lens, the total number of lenses included in the first positive lens unit is three, and a specific positive lens having the largest thickness on the optical axis among the positive lenses in the first positive lens unit satisfies the following conditional expression (5):

$$0.25 d_{P1P}/D_{1P} < 0.55 \quad (5),$$

where $d_{P1P}$ is the thickness of the specific positive lens on the optical axis, and $D_{1P}$ is the thickness of the first positive lens unit on the optical axis.

29. The image pickup apparatus according to claim 1, wherein the first positive lens unit includes four lenses.

30. The image pickup apparatus according to claim 1, wherein the image side lens unit group comprises a second negative lens unit having a negative refractive power arranged between the second positive lens unit and the third positive lens unit, and the distance between the second negative lens unit and the second positive lens unit and the distance between the second negative lens unit and the third positive lens unit vary during zooming from the wide angle end to the telephoto end.

31. The image pickup apparatus according to claim 30, wherein the following conditional expression (10) is satisfied:

$$-0.25 < f_{2N}/f_t < -0.05 \quad (10),$$

where $f_{2N}$ is the focal length of the second negative lens unit, and $f_t$ is the focal length of the entire zoom lens system at the telephoto end.

32. The image pickup apparatus according to claim 1, wherein the third positive lens unit consists of one lens component,
where the lens component is a lens block having only two surfaces, namely, an object-side surface and an image-side surface, are in contact with air.

33. The image pickup apparatus according to claim 1, wherein the following conditional expression (14) is satisfied:

$$0.4 < (TL_t - TL_w)/TL_w \quad (14),$$

where $TL_t = TZL_t + FB_t$, and $TL_w = TZL_w + FB_w$, where $TZL_t$ is the distance on the optical axis from the object side surface to the image side surface of the zoom lens at the telephoto end, $FB_t$ is the back focus of the zoom lens at the telephoto end expressed in the equivalent air distance, $TZL_w$ is the distance on the optical axis from the object side surface to the image side surface of the zoom lens at the wide angle end, and $FB_w$ is the back focus of the zoom lens at the wide angle end expressed in the equivalent air distance.

34. The image pickup apparatus according to claim 1, wherein the first negative lens unit comprises in order from an object side, a negative lens, a negative lens, and a positive lens.

35. The image pickup apparatus according to claim 1, wherein the following conditional expressions (7) and (8) are satisfied:

$$0.1 < f_{1P}/f_t < 0.5 \quad (7), \text{ and}$$

$$-0.15 < f_{1N}/f_t < -0.02 \quad (8),$$

where $f_{1P}$ is the focal length of the first positive lens unit, $f_{1N}$ is the focal length of the first negative lens unit, and $f_t$ is the focal length of the entire zoom lens system at the telephoto end.

36. The image pickup apparatus according to claim 1, wherein the following conditional expressions (9) and (11) are satisfied:

$$0.05 < f_{2P}/f_t < 0.15 \quad (9), \text{ and}$$

$$0.05 f_{3P}/f_t < 0.20 \quad (11),$$

where $f_{2P}$ is the focal length of the second positive lens unit, $f_{3P}$ is the focal length of the third positive lens unit, and $f_t$ is the focal length of the entire zoom lens system at the telephoto end.

* * * * *